United States Patent
Satoh et al.

(10) Patent No.: US 8,974,296 B2
(45) Date of Patent: Mar. 10, 2015

(54) GAME PROGRAM AND GAME APPARATUS

(75) Inventors: Tetsuya Satoh, Kyoto (JP); Youhei Kubotsu, Kyoto (JP)

(73) Assignee: Nintendo Co., Ltd, Kyoto (JP)

( * ) Notice: Subject to any disclaimer, the term of this patent is extended or adjusted under 35 U.S.C. 154(b) by 795 days.

(21) Appl. No.: 12/549,682

(22) Filed: Aug. 28, 2009

(65) Prior Publication Data
US 2010/0160044 A1 Jun. 24, 2010

(30) Foreign Application Priority Data

Dec. 22, 2008 (JP) ................................. 2008-326124

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/40 | (2014.01) |

(52) U.S. Cl.
CPC .......... *A63F 13/10* (2013.01); *A63F 2300/1093* (2013.01); *A63F 2300/204* (2013.01); *A63F 2300/6072* (2013.01)
USPC ................... 463/31; 463/36; 463/37; 463/38; 463/39; 463/40; 463/41; 463/42

(58) Field of Classification Search
CPC ................... A63F 2009/243; A63F 2009/2432; A63F 2009/2433; A63F 2009/2435
USPC ............................................................ 463/31
See application file for complete search history.

(56) References Cited

U.S. PATENT DOCUMENTS

| | | | | |
|---|---|---|---|---|
| 6,023,688 | A * | 2/2000 | Ramachandran et al. ...... | 705/44 |
| 6,645,075 | B1 * | 11/2003 | Gatto et al. ..................... | 463/25 |
| 2001/0000025 | A1 * | 3/2001 | Darrell et al. ................. | 382/103 |
| 2002/0132663 | A1 * | 9/2002 | Cumbers ......................... | 463/25 |
| 2005/0282603 | A1 * | 12/2005 | Parrott et al. .................... | 463/1 |
| 2006/0287079 | A1 * | 12/2006 | Nonaka et al. ................. | 463/29 |

FOREIGN PATENT DOCUMENTS

| | | |
|---|---|---|
| JP | 2000-187499 A | 7/2000 |
| JP | 2002-320773 A | 11/2002 |
| JP | 2003-248837 A | 9/2003 |
| JP | 2006-204410 | 8/2006 |

* cited by examiner

*Primary Examiner* — Kevin Y Kim
(74) *Attorney, Agent, or Firm* — Nixon & Vanderhye P.C.

(57) ABSTRACT

A game apparatus executes game processing on the basis of microphone input information input through a microphone. The CPU of the game apparatus executes an imaging step for imaging a user with a camera, a detection determining step for determining whether or not a user is detected on the basis of image data indicating the image obtained by imaging through the imaging step, and a performing step for performing the game processing on the basis of the microphone input information when the detection determining step determines that the user is detected.

14 Claims, 20 Drawing Sheets

| 0/64 | 10/64 | 0/64 |
|---|---|---|
| 10/64 | 24/64 | 10/64 |
| 0/64 | 10/64 | 0/64 |

(B) 52

| 0/64 | 2/64 | 3/64 | 2/64 | 0/64 |
|---|---|---|---|---|
| 2/64 | 3/64 | 4/64 | 3/64 | 2/64 |
| 3/64 | 4/64 | 8/64 | 4/64 | 3/64 |
| 2/64 | 3/64 | 4/64 | 3/64 | 2/64 |
| 0/64 | 2/64 | 3/64 | 2/64 | 0/64 |

(C) 52

| 0/64 | 0/64 | 1/64 | 1/64 | 1/64 | 0/64 | 0/64 |
|---|---|---|---|---|---|---|
| 0/64 | 1/64 | 2/64 | 2/64 | 2/64 | 1/64 | 0/64 |
| 1/64 | 2/64 | 2/64 | 3/64 | 2/64 | 2/64 | 1/64 |
| 1/64 | 2/64 | 3/64 | 4/64 | 3/64 | 2/64 | 1/64 |
| 1/64 | 2/64 | 2/64 | 3/64 | 2/64 | 2/64 | 1/64 |
| 0/64 | 1/64 | 2/64 | 2/64 | 2/64 | 1/64 | 0/64 |
| 0/64 | 0/64 | 1/64 | 1/64 | 1/64 | 0/64 | 0/64 |

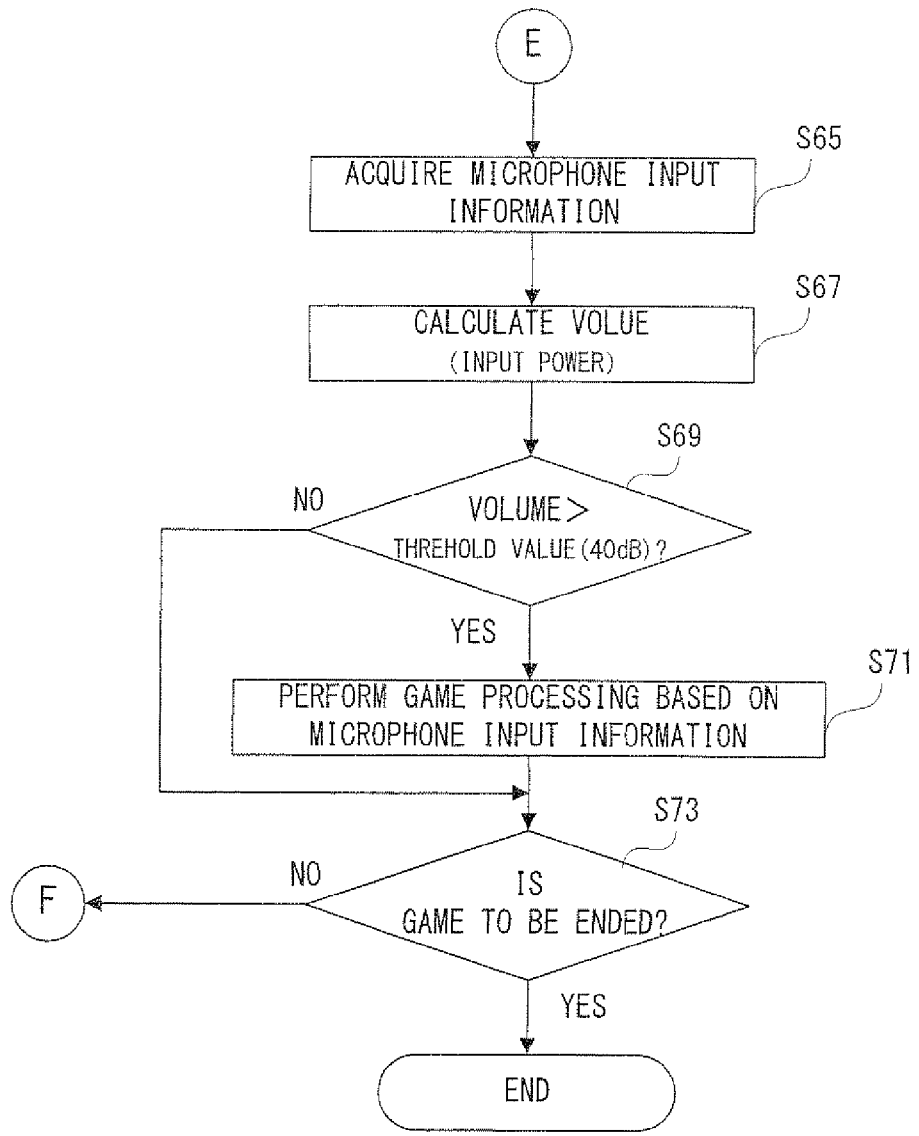

GAME PROGRAM AND GAME APPARATUS

CROSS REFERENCE OF RELATED APPLICATION

The disclosure of Japanese Patent Application No. 2008-326124 is incorporated herein by reference.

BACKGROUND

1. Technical Field

The technology presented herein relates to a game program and a game apparatus. More specifically, the present technology relates to a game program and a game apparatus which are able to execute game processing on the basis of microphone input information input through a microphone.

2. Description of the Related Art

As a conventional game program of such a kind, one disclosed in Japanese Patent Application Laid-Open No. 2006-204410 is known. In the background art, microphone input information input through a microphone is stored in a memory, and predetermined game processing is performed on the basis of the stored microphone information.

However, in the background art, even when a user does not actually perform an operation, there is a possibility that microphone input information due to sounds input from persons other than the user, winds may be determined to be valid and thus reflected on the game processing. Accordingly, there is a room for improvement for reflecting an operation according to an input through a microphone on the game processing just as the user intended.

SUMMARY

Therefore, it is a primary feature of the example embodiments presented herein to provide a novel game program and game apparatus.

Another feature of the present embodiments is to provide a game program and a game apparatus which are able to reflect an operation by a microphone input on the game processing just as the user intended.

The present embodiments adopt the following configurations in order to solve the above-described problems.

A first embodiment is a game program which causes a computer of a game apparatus executing game processing on the basis of microphone input information input through a microphone to execute: an imaging step for imaging a user with a camera, a detection determining step for determining whether or not the user is detected on the basis of image data representing the image obtained through the imaging by the imaging step, and a processing step for executing the game processing on the basis of the microphone input information when the detection determining step determines that the user is detected.

In the first embodiment, a game apparatus executes game processing on the basis of microphone input information input through the microphone. A game program causes a computer of the game apparatus to execute an imaging step, a detection determining step, and a processing step. The imaging step images a user with a camera, and the detection determining step determines whether or not the user is detected on the basis of image data representing the image obtained through the imaging by the imaging step. The processing step executes the game processing on the basis of the microphone input information when the detection determining step determines that the user is detected. Alternatively, when the detection determining step determines that the user is not detected, the game processing based on the microphone input information is not executed.

According to the first embodiment, in a case that a user is detected from the imaged image, a microphone input is made valid, and therefore, it is possible to reflect an operation by an input through the microphone on the game processing as the user intended.

A second embodiment is a game program, and the detection determining step determines whether or not the user is detected by determining whether or not a skin color of the user is detected on the basis of the image data representing the image obtained through the imaging by the imaging step.

A third embodiment is a game program, and the game program causes the computer to further execute a skin color region calculating step for calculating a size of a skin color region on the basis of the image data representing the image obtained through the imaging by the imaging step, and the detection determining step determines that the skin color of the user is detected when the size of the skin color region calculated by the skin color region calculating step is equal to or more than a predetermined value.

In the third embodiment, the game program causes the computer to further execute a skin color region calculating step. The skin color region calculating step calculates a size of a skin color region on the basis of the image data representing the image obtained through the imaging by the imaging step. The detection determining step determines that the skin color of the user is detected when the size of the skin color region calculated by the skin color region calculating step is equal to or more than a predetermined value. Here, when the size calculated in the skin color region calculating step does not satisfy the predetermined value, it is determined that the skin color of the user is not detected.

According to the third embodiment, the size of the skin color region is calculated from the imaged image, and when the size of the skin color region is equal to or more than the predetermined value, it is determined that the user is detected, and therefore, it is possible to easily perform a precise determination.

A fourth embodiment is a game program, and the skin color region calculating step calculates a ratio of the skin color to the image obtained through the imaging by the imaging step, and the detection determining step determines that the skin color of the user is detected when the ratio calculated by the skin color region calculating step is equal to or more than the predetermined value.

In the fourth embodiment, the skin color region calculating step calculates a ratio of the skin color to the image obtained through the imaging by the imaging step. The detection determining step determines that the skin color of the user is detected when the ratio calculated by the skin color region calculating step is equal to or more than the predetermined value. Alternatively, when the ratio calculated by the skin color region calculating step does not satisfy the predetermined value, it is determined that the skin color of the user is not detected.

According to the fourth embodiment, the ratio of the skin color region is calculated from the imaged image, and when the ratio of the skin color region is equal to or more than the threshold value, it is determined that the user is detected, and therefore, it is possible to easily make a precise determination irrespective of the size of the image.

A fifth embodiment is a game program, and the game program causes the computer to further execute a region setting step for setting a predetermined region, and the skin color region calculating step calculates the size of the skin color region within the predetermined region set by the region setting step.

In the fifth embodiment, the game program causes the computer to further execute a region setting step. The region setting step sets a predetermined region, and the skin color region calculating step calculates the size of the skin color region within the predetermined region set by the region setting step.

According to the fifth embodiment, the skin color region is determined within the predetermined region, and therefore, by selecting a region where it is highly possible that the face is displayed, for example, as a predetermined region, it is possible to more accurately determine a user's operation. Here, in one embodiment, the predetermined region is fixedly set, but in another embodiment, it may be variably set according to an operation by a user.

A sixth embodiment is a game program, and the detection determining step determines whether or not the user is detected by determining that an entire or a part of the face of the user is detected on the basis of the image data representing the image obtained through the imaging by the imaging step.

A seventh embodiment is a game program, and the game program causes the computer to further execute a microphone input determining step for determining whether or not the microphone input information satisfies a predetermined condition, and the processing step performs the game processing on the basis of the microphone input information when the detection determining step determines that the user is detected, and the microphone input determining step determines that the predetermined condition is satisfied.

In the seventh embodiment, the game program causes the computer to further execute a microphone input determining step. The microphone input determining step determines whether or not the microphone input information satisfies a predetermined condition. The processing step executes the game processing on the basis of the microphone input information when the detection determining step determines that the user is detected, and the microphone input determining step determines that the predetermined condition is satisfied. Here, when the detection determining step determines that the user is not detected, or when the microphone input determining step does not determine that the predetermined condition is not satisfied, the game processing based on the microphone input information is not performed.

According to the seventh embodiment, the microphone input is made valid in a case that the microphone input information satisfies the predetermined condition, and therefore, by setting a condition that the power is equal to or more than a constant value as a predetermined condition, for example, it is possible to prevent an erroneous detection.

An eighth embodiment is a game program, and the game program causes the computer to execute a preliminary-imaging step for imaging the user in advance, and a feature data calculating step for calculating feature data indicating a feature of the user on the basis of the image data representing the image obtained by imaging the user in advance by the preliminary-imaging step, wherein the detection determining step determines whether or not the user is detected on the basis of the image data representing the image obtained through the imaging by the imaging step and the feature data calculated by the feature data calculating step.

In the eighth embodiment, the game program causes the computer to further execute a preliminary-imaging step and a feature data calculating step. The preliminary-imaging step images the user in advance, and the feature data calculating step calculates feature data indicating a feature of the user on the basis of the image data representing the image obtained by imaging the user in advance by the preliminary-imaging step. The detection determining step determines whether or not the user is detected on the basis of the image data representing the image obtained through the imaging by the imaging step and the feature data calculated by the feature data calculating step.

According to the eighth embodiment, by taking the feature data of the user as a reference, it is possible to precisely detect the user.

A ninth embodiment is a game program, and the feature data calculating step calculates a skin color threshold value corresponding to the feature of the skin color of the user on the basis of the image data representing the image obtained by imaging the user in advance, and the game program causes the computer to further execute a skin color image extracting step for extracting a skin color image from the image obtained through the imaging by the imaging step on the basis of the skin color threshold value calculated by the feature data calculating step, and a skin color region calculating step for calculating a size of a skin color region in the image on the basis of the image data representing the image obtained through the imaging by the imaging step and the image data indicating the skin color image extracted from the skin color image extracting step, and the detection determining step determines that the user is detected when the size of the skin color region calculated by the skin color region calculating step is equal to or more than a predetermined value.

In the ninth embodiment, the game program causes the computer to further execute a skin color image extracting step and a skin color region calculating step. The feature data calculating step calculates a skin color threshold value corresponding to the feature of the skin color of the user on the basis of the image data representing the image obtained by imaging the user in advance. The skin color image extracting step extracts a skin color image from the image obtained through the imaging by the imaging step on the basis of the skin color threshold value calculated by the feature data calculating step. The skin color region calculating step calculates a size of a skin color region in the image on the basis of the image data representing the image obtained through the imaging by the imaging step and the image data indicating the skin color image extracted from the skin color image extracting step. The detection determining step determines that the user is detected when the size of the skin color region calculated by the skin color region calculating step is equal to or more than a predetermined value. Here, when the size of the skin color region calculated in the skin color region calculating step does not satisfy the predetermined value, it is determined that the user is not detected.

That is, the skin color threshold value is calculated as one of the feature data of the skin color of the user. Here, in one embodiment, the skin color threshold value is corrected on the basis of the image data indicating the image obtained by imaging in advance the user (in other words, the correction value is calculated), but the calculation of the skin color threshold value includes such a correction and a corrected value.

According to the ninth embodiment, the skin color region is extracted by utilizing the skin color threshold value corresponding to the feature of the skin color, and therefore, it is possible to further perform accurate detection of the user.

A tenth embodiment is a game program, and the feature data calculating step calculates skin color feature data indicating the feature of the skin color of the user on the basis of the image data representing the image obtained by imaging the user in advance, and the detection determining step determines whether or not the user is detected on the basis of the image data representing the image obtained through the imaging by the imaging step and the skin color feature data calculated by the feature data calculating step.

According to the tenth embodiment, the skin color feature data indicating the feature of the skin color is used as feature data, and therefore, it is possible to easily perform precise detection of the user.

An eleventh embodiment is a game apparatus executing game processing on the basis of microphone input information input through a microphone, and comprises an imaging means for imaging a user, a detection determining means for determining whether or not the user is detected on the basis of image data representing the image obtained through the imaging by the imaging means, and a processing means for executing the game processing on the basis of the microphone input information when the detection determining means determines that the user is detected.

According to the eleventh embodiment, similar to the first embodiment, it is possible to reflect an operation by an input through the microphone on the game processing just as the user intended.

A twelfth embodiment is a game apparatus, and the imaging means and the microphone are provided such that an imaging direction and a sound collecting direction are substantially in parallel with each other (both are in parallel with the z axis).

According to the twelfth embodiment, the imaging direction and the sound collecting direction are substantially in parallel with each other, and therefore, detection of the microphone input and detection of the user can be simultaneously performed, capable of improving accuracy of the detection.

A thirteenth embodiment is a game processing method executing game processing on the basis of microphone input information input through a microphone, and comprises an imaging step for imaging a user with a camera, a detection determining step for determining whether or not the user is detected on the basis of image data representing the image obtained through the imaging by the imaging step, and a processing step for executing the game processing on the basis of the microphone input information when the detection determining step determines that the user is detected.

According to the thirteenth embodiment, similar to the first embodiment, it is possible to reflect an operation by an input through the microphone on the game processing just as the user intended.

According to the present embodiments, while the user is not detected, the microphone input is made invalid, and while the user is detected, the microphone input is made valid, and therefore, it is possible to reflect an operation by an input through the microphone on the game processing just as the user intended.

The above described features, aspects and advantages of the present embodiments will become more apparent from the following detailed description of the present embodiments when taken in conjunction with the accompanying drawings.

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 6(A) shows a screen at the beginning of the game, and FIG. 6(B) shows a screen at the progress of the game;

FIG. 11 is an illustrative view showing a concrete example of a weighting factor, FIG. 11(A) shows one example of a single grid, FIG. 11(B) shows one example of a double grid, and FIG. 11(C) shows one example of a triple grid;

FIG. 21 is a flowchart showing a still another part of the operation by the CPU corresponding to FIG. 18 embodiment; and FIG. 22 is an illustrative view showing one example of a determination result based on a threshold value, and corresponds to FIG. 11(A).

DETAILED DESCRIPTION OF THE PREFERRED EMBODIMENTS

Figure 1:
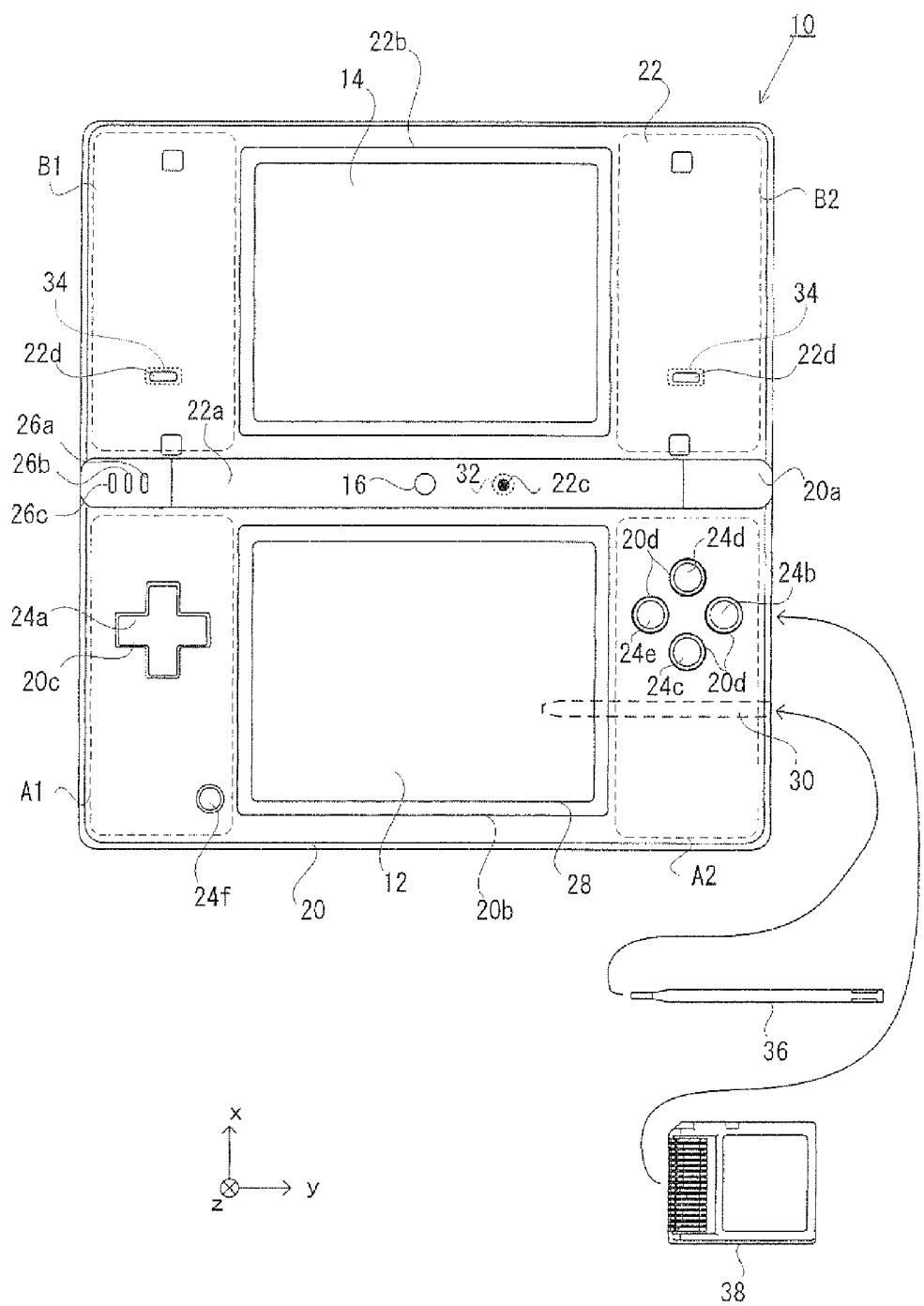
FIG. 1 is an external view of a game apparatus of one embodiment to show one side thereof in an open state.
Figure 2:
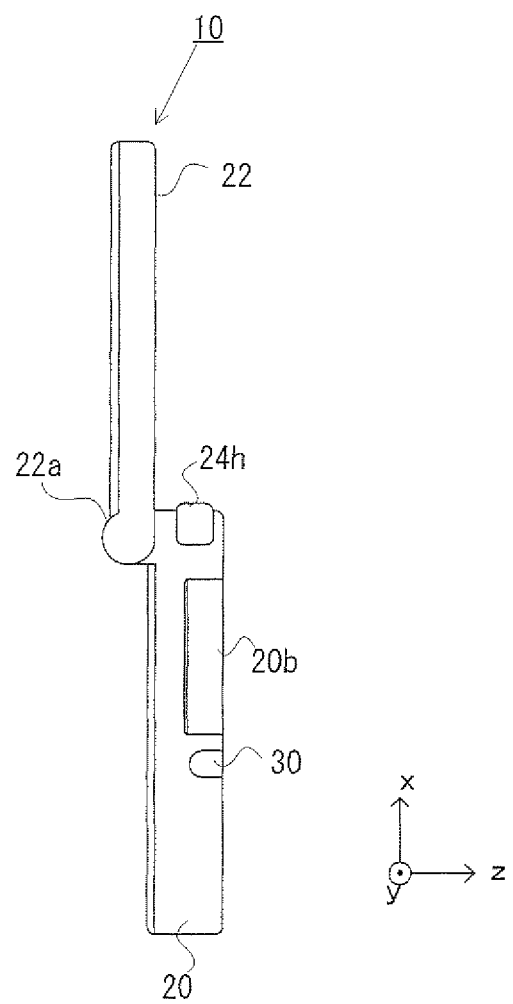
FIG. 2 is an external view of the game apparatus to show a side surface thereof in the open state.
Figure 3:
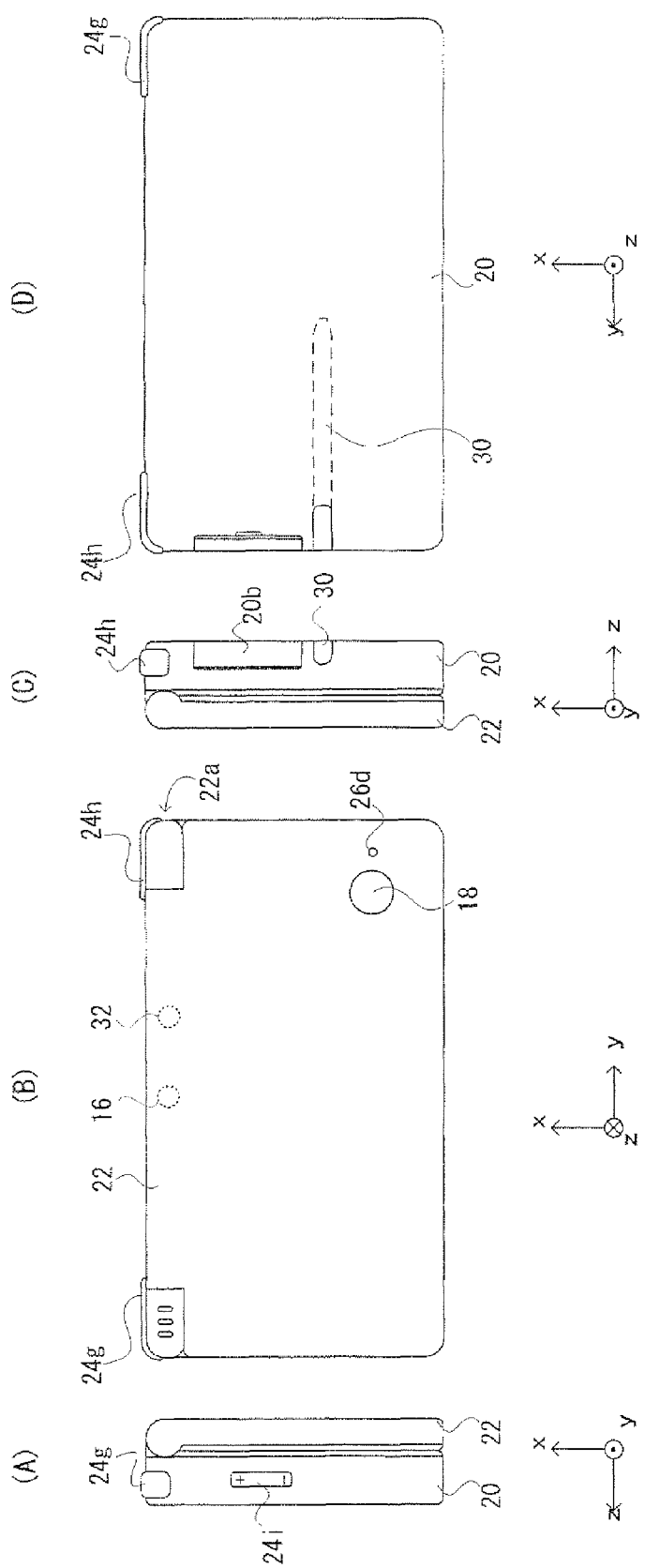
FIG. 3 is an external view of the game apparatus.

In FIG. 1-FIG. 3, an external view of the game apparatus 10 of one embodiment is shown. The game apparatus 10 is a foldable game apparatus, and each of FIG. 1 and FIG. 2 shows the game apparatus 10 in a opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image an image with the camera, display the imaged image and store the data of the imaged image.

The game apparatus 10 is constructed small enough to be held by the user with both of the hands or one hand even in the open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is supported pivotally at a part of the upper side of the lower housing 20. This makes the game apparatus 10 to take a close state (the angle formed by the lower housing 20 and the upper housing 22 is about 0° (see FIG. 3)) and an open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc. exerted on the hinge as well as the close state and the open state as described above. That is, the upper housing 12 can be fixed with respect to the lower housing 14 at an arbitrary angle.

First, the configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is provided on an inner surface of the lower housing 20. Accordingly, if the game apparatus 10 is not to be used, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electro Luminescence), for example, may be used. Furthermore, the game apparatus 10 can employ a display of an arbitrary resolution. Additionally, in a case that the game apparatus 10 is used as an imaging device, the lower LCD 12 is used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a-24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1. More specifically, areas for arranging the respective buttons 24a-24e; button arranging area) are provided.

On the lower housing 20, the respective buttons 24a-24i and a touch panel 28 are provided as an input device. As shown in FIG. 1, the direction input button 24a, the button 24b, the button 24c, the button 24d, the button 24e, and the power button 24f out of the respective buttons 24a-24i are provided on the inner surface of the lower housing 20. The direction input button 24a is utilized for a selecting operation, for example, and the respective buttons 24b-24e are utilized for a decision operation and a cancel operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b-24e are provided at the other side (right side in FIG. 1) of the lower LCD 12. The direction input button 24a and the buttons 24b-24e are utilized for performing various operations to the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3(C) and FIG. 3(A), the volume button 24i is provided on the left side surface of the lower housing 20. The volume button 24i is utilized for adjusting a volume of a speaker 34 furnished in the game apparatus 10. Furthermore, as shown in FIG. 3(D), the button 24h is provided at the right corner of the upper side surface of the lower housing 20. The button 24g is provided at the left corner of the upper side surface of the lower housing 20. The both of the buttons 24g and 24h are utilized for performing a imaging instructing operation (shutter operation) on the game apparatus 10, for example. Alternatively, both of the buttons 24g and 24h may be made to work as shutter buttons. In this case, a right-handed user can use the button 24h, and a left-handed user can use the button 24g, capable of improving usability for both of the users. Additionally, the game apparatus 10 can constantly make both of the buttons 24g and 24h valid as shutter buttons, or the game apparatus 10 is set to be a right-handed use or a left-handed use (the setting is input by the user according to a menu program, etc. and the set data is stored), and when the right-handed use is set, only the button 24h is made valid, and when the left-handed use is set, only the button 24g may be made valid.

As shown in FIG. 1, the game apparatus 10 is further provided with the touch panel 28 as an input device other than the respective operation buttons 24a-24i. The touch panel 28 is set to the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having the same resolution (detection accuracy) as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can accommodate a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

As shown in FIG. 3(A), on the right side surface of the lower housing 20, an openable and closeable cover portion 11B is provided. Inside the cover portion 11B, a connector (not illustrated) for electrically connecting the game apparatus 10 and the memory card 38 is provided. The memory card 38 is detachably attached to a connector. The memory card 38 is used for storing (saving) image data imaged by the game apparatus 10, for example.

As shown in FIG. 1, at the left of the shaft portion 20a of the lower housing 20, three LEDs 26a-26c are attached. Here, the game apparatus 10 can perform a wireless communication with another appliance, and the first LED 26a lights up when a wireless communication with the appliance is established. The second LED 26b lights up while the game apparatus 10 is recharged. The third LED 26c lights up when the main power supply of the game apparatus 10 is turned on. Accordingly, by the three LEDs 26a-26c, it is possible to inform the user of a communication-established state, a charge state, and a main power supply on/off state of the game apparatus 10.

Figure 5:
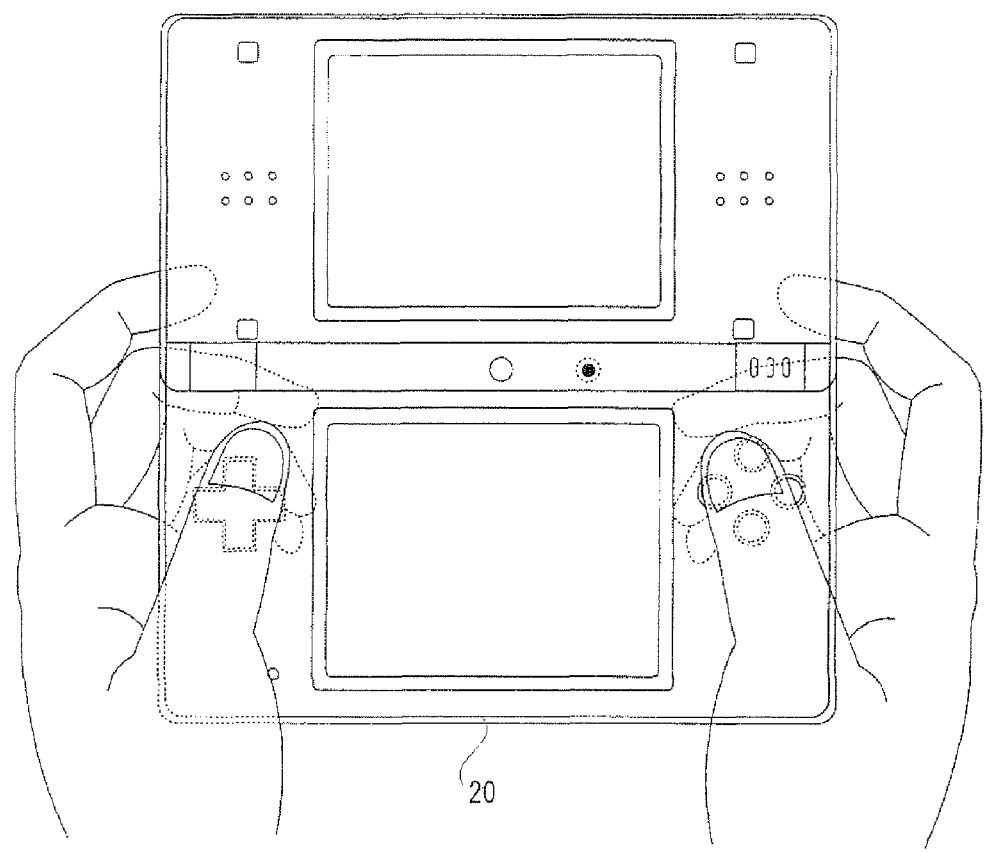
FIG. 5 is an illustrative view showing a state that the game apparatus is held by the user.

As described above, the lower housing 20 is provided with the input device (touch panel 28 and respective buttons 24a-24i) for performing an operation input to the game apparatus 10. Accordingly, when utilizing the game apparatus 10, the user can perform an operation on the game apparatus 10 while holding the lower housing 20. FIG. 5 shows a situation in which the user holds the game apparatus 10 with both of the hands. As shown in FIG. 5, the user holds the side surface and the outer surface (surface opposite to the inner surface) of the lower housing 20 with the palms, the middle fingers, the ring fingers and the little fingers of both of the hands in a state that the respective LCDs 12 and 14 are directed to the user. By holding the game apparatus 10 in such a manner, the user can perform operations as to the respective buttons 24a-24e with the thumbs, and perform operations as to the buttons 24g and 24h with the index fingers while holding the lower housing 20.

On the other hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is set to the upper housing 22. The upper LCD 14 takes a horizontally-long shape, and is arranged such that the direction of the long side is coincident with the long side of the upper housing 22. The upper LCD 14 is provided on the inner surface of the upper housing 2 (the inner surface when the game apparatus 10 is in the close state). Accordingly, if the game apparatus 10 is not to be used, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other hand, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22a formed at the bottom of the upper housing 22. That is, the inward camera 16 is attached at the center of the part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, "the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14. In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set, to the close state. Here, since the outward camera 18 is not for imaging the user holding the game apparatus 10, there is less need for being provided at the center of the game apparatus 10.

Furthermore, as shown in FIG. 1 or FIG. 3(B), a microphone 32 is housed in the upper housing 22. More specifically, the microphone 32 is attached to the shaft portion 22a of the upper housing 22. In this embodiment, the microphone 32 is attached around the inward camera 16 (next to the inward camera 16 along the y axis), and specifically attached next to the inward camera 16 in the positive direction of the y axis. Furthermore, a through hole for microphone 22c is mounted to the shaft portion 22a at a position corresponding to the microphone 32 (next to the inward camera 16) such that the microphone 32 can detect a sound outside the game apparatus 10. Alternatively, the microphone 32 may be housed in the lower housing 20. For example, the through hole for microphone 22c is provided on the inner surface of the lower housing 20, specifically, at the lower left (button arranging area A1) of the inner surface of the lower housing 20, and the microphone 32 may be arranged in the vicinity of the through hole for microphone 22c within the lower housing 20.

Furthermore, the microphone 32 is attached in such a direction that its sound collecting direction (direction in which the sensitivity becomes maximum) is approximately in parallel with the imaging direction (optical axis) of the inward camera 16 (in other words, the sound collecting direction and the imaging direction are approximately in parallel with the y axis). Thus, a sound generated within the imaging range of the inward camera 16 is suitably acquired by the microphone 32. That is, detection of an input through the microphone 32 and detection of the user can be simultaneously performed, and accuracy of the detections can be improved, at the same time.

As shown in FIG. 3(B), on the outer surface of the upper housing 22, a fourth LED 26d is attached. The fourth LED 26d is attached around the outward camera 18 (at the right side of the outward camera 18 in this embodiment. The fourth LED 26d lights up at a time when an imaging is made with the inward camera 16 or the outward camera 18 (shutter button is pushed). Furthermore, the fourth LED 38 continues to light up while a motion image is imaged by the inward camera 16 or the outward camera 18. By making the fourth LED 26d light up, it is possible to inform an object to be imaged that an imaging with the game apparatus 10 is made (is being made).

Furthermore, the inner surface of the lower housing 22 is formed to be approximately planar. As shown in FIG. 1, at the center of the inner surface, an opening 21b for exposing the upper LCD 14 is formed. The screen of the upper LCD 14 housed inside the upper housing 22 is exposed from the opening 21B. Furthermore, on both side of the aforementioned opening 21B, a sound release hole 22d is formed one by one. Inside the sound release hole 22d of the upper housing 22, a speaker 34 is hosed. The sound release hole 22d is a through hole for releasing a sound from the speaker 34.

Thus, on the inner surface of the upper housing 22, non-display areas (areas B1 and B2 represented by a dotted lines in FIG. 1. More specifically, areas for arranging the speaker 34; speaker arranging areas) are provided on both sides of the opening 21B set at the center of the upper LCD 14. The two sound release holes 22d are arranged at approximately the center of the horizontal direction of each speaker arranging area with respect to the horizontal direction, and at the lower portion of each speaker arranging area with respect to the vertical direction (area close to the lower housing 20).

Here, as described above, by providing the non-display areas on the lower housing 20 and the upper housing 22 at the same positions in the horizontal direction, the game apparatus 10 is configured to help user's holding not only when it is held horizontally as shown in FIG. 5, but also when it is held vertically (a state rotated to left or right by 90° from the state shown in FIG. 5).

As described above, the upper housing 22 is provided with the cameras 16 and 18 which are configured to image an image and the upper LCD 14 as a display means for mainly displaying the imaged image. On the other hand, the lower housing 20 is provided with the input device (touch panel 28 and respective buttons 24a-24i) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device. In addition, although the detail is described later, the user performs a sound input over the microphone 32, and on the basis of the microphone input information, the game apparatus 10 can execute the game processing as well.

Figure 4:
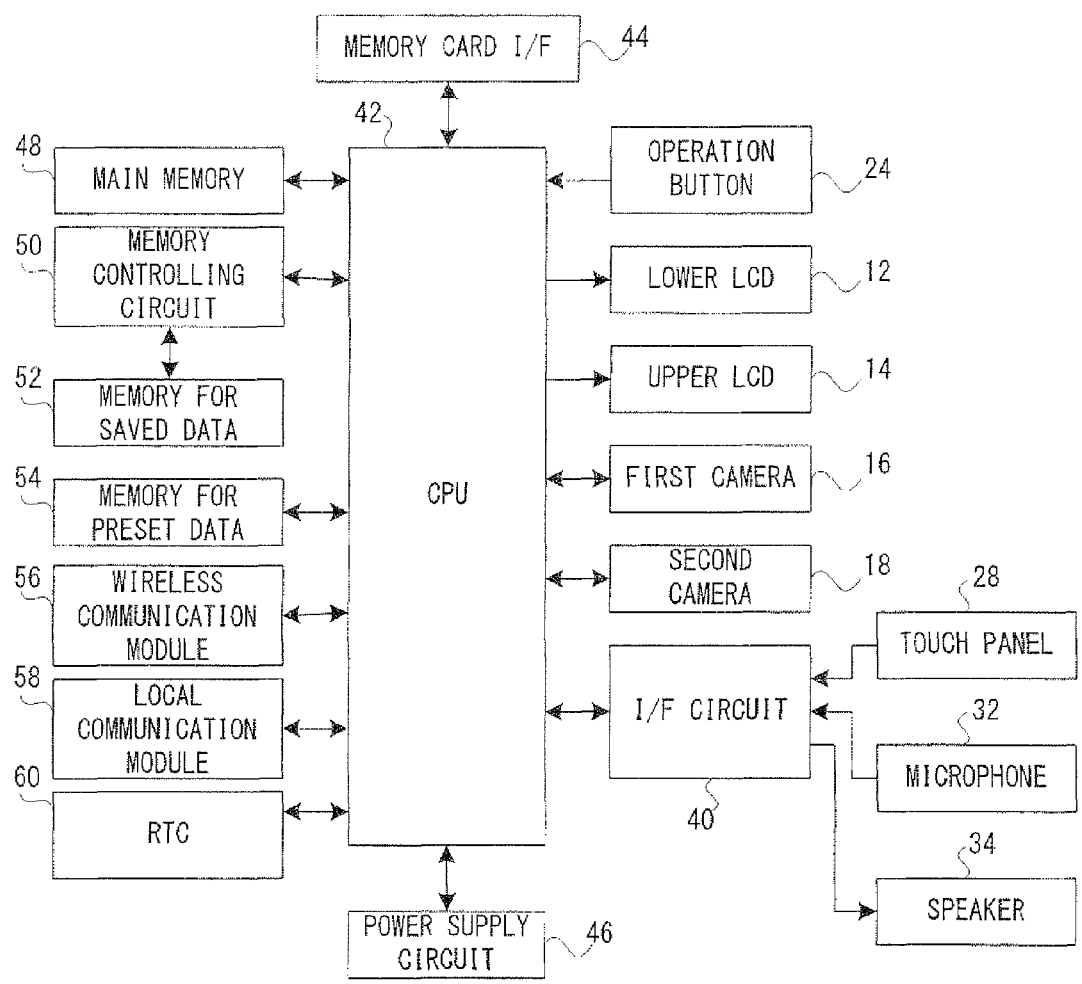
FIG. 4 is a block diagram showing one example of an electric configuration of the game apparatus.

FIG. 4 is a block diagram showing an internal configuration of the game apparatus 10. As shown in FIG. 4, the game apparatus 10 includes electronic components, such as a CPU 42, a main memory 48, a memory controlling circuit 50, a memory for saved data 52, a memory for preset data 54, a memory card interface (memory card I/F) 44, a wireless communication module 56, a local communication module 58, a real-time clock (RTC) 39, a power supply circuit 46, and an interface circuit (I/F circuit) 40, etc. Theses electronic components are mounted on an electronic circuit board, and housed in the lower housing 20 (or the upper housing 22 may also be appropriate).

The CPU 42 is an information processing means to execute various programs. In a case that the game apparatus 10 is utilized as an imaging device, the program for it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38, and may be acquired from another appliance by communicating with this another appliance.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the imaging processing, and stores a program obtained from the outside (memory cards 38, another appliance, etc.). In this embodiment, a PSRAM (Pseudo-SRAM) is used, for example, as a main memory 48. The memory for saved data 42 is a memory means for storing (saving) a program to be executed by the CPU 42, data of an image imaged by the respective cameras 16 and 18, etc. The memory for saved data 52 is configured by a NAND type flash memory, for example. The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory card 38 attached to the connector according to an instruction from the CPU 42. In this embodiment, the image data imaged by the respective cameras 16 and 18 is written to the memory card 38, and the image data stored in the memory card 38 is read from the memory card 38 and stored in the memory for saved data 52.

The wireless communication module 56 has a function of connecting to a wireless LAN according to an IEEE802.11.b/g standard-based system, for example. Furthermore, the local communication module 58 has a function of performing a wireless communication with the same types of the game apparatuses by a predetermined communication system. The wireless communication module 56 and local communication module 58 are connected to the CPU 42. The CPU 42 can send and receive data over the Internet with other appliances by means of the wireless communication module 56, and can send and receive data with the same types of other game apparatuses by means of the local communication module 58.

Additionally, the CPU 42 is connected with the RTC 60 and the power supply circuit 46. The RTC 60 counts a time to output the same to the CPU 42. The CPU 42 can calculate a current time (date) on the basis of the time counted by the RTC 60, and detects an operation timing as to when an image is to be acquired, etc. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user and outputs a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data is written to a sound area 80 (see FIG. 7) of the main memory 48. If the game apparatus 10 is utilized as a recording device, the audio data stored in the sound area 80 is written to the memory for saved data 52 via the memory controlling circuit 50 thereafter (recorded in the memory card 38 via the memory card I/F 44 as required). Although a detail is described later, the audio data (microphone input information) stored in the sound area 80 is also utilized for various game processing. The touch panel controlling circuit generates touch position data in a predetermined format on the basis of a signal from the touch panel 28 and outputs the same to the CPU 42. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 can know the position where an input is made on the touch panel 22 by acquiring the touch position data.

The operating portion 24 is made up of the aforementioned respective buttons 24*a*-24*i*, and connected to the CPU 42. The operation data indicating a input state (whether or not to be pushed) with respect to each of the operation buttons 24*a*-24*k* is output from the operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output image data corresponding to the imaged images to the CPU 42. The CPU 42 writes the image data from each of the cameras 16 and 18 to an image area 78 (see FIG. 7) of the main memory 48. In a case that the game apparatus 10 is utilized as an imaging device, the image data stored in the image area 78*i* written to the memory for saved data 52 via the memory controlling circuit 50 (and moreover recorded in the memory card 38 via the memory card I/F 44 as required). Furthermore, although the detail is described later, the image data sorted in the image area 78 can also be utilized for various game processing.

In addition, each of the LCDs 12 and 14 is connected to the CPU 42. Each of the LCDs 12 and 14 displays an image according to an instruction by the CPU 42. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12. If a game is played with the game apparatus 10, a game image is displayed on one or both of the LCD 12 and 14.

Figure 6:
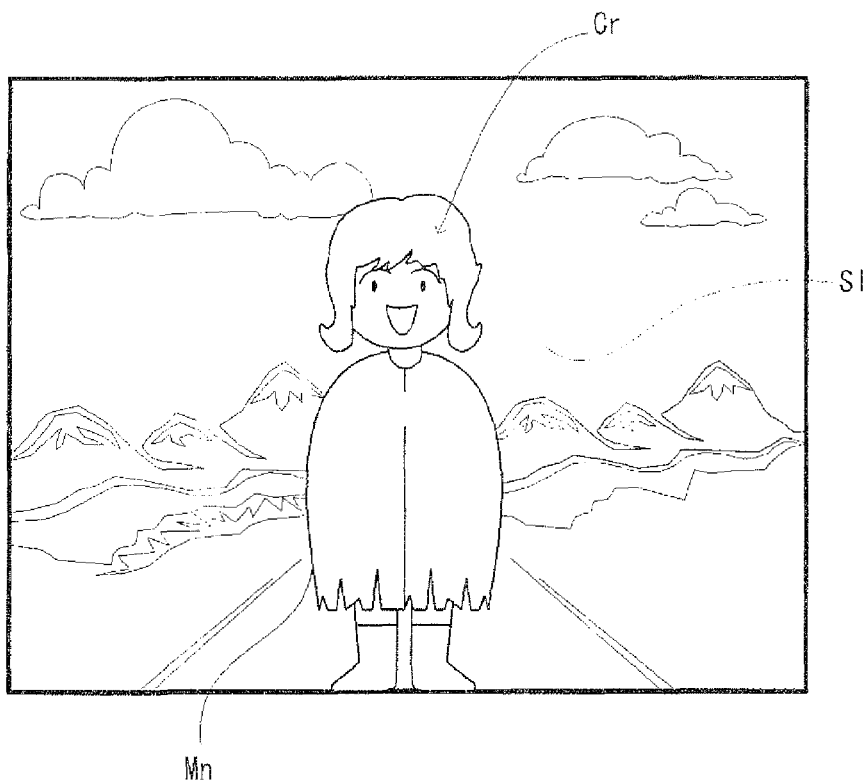
FIG. 6 is an illustrative view showing one example of a change of the game screen.
Figure 6:
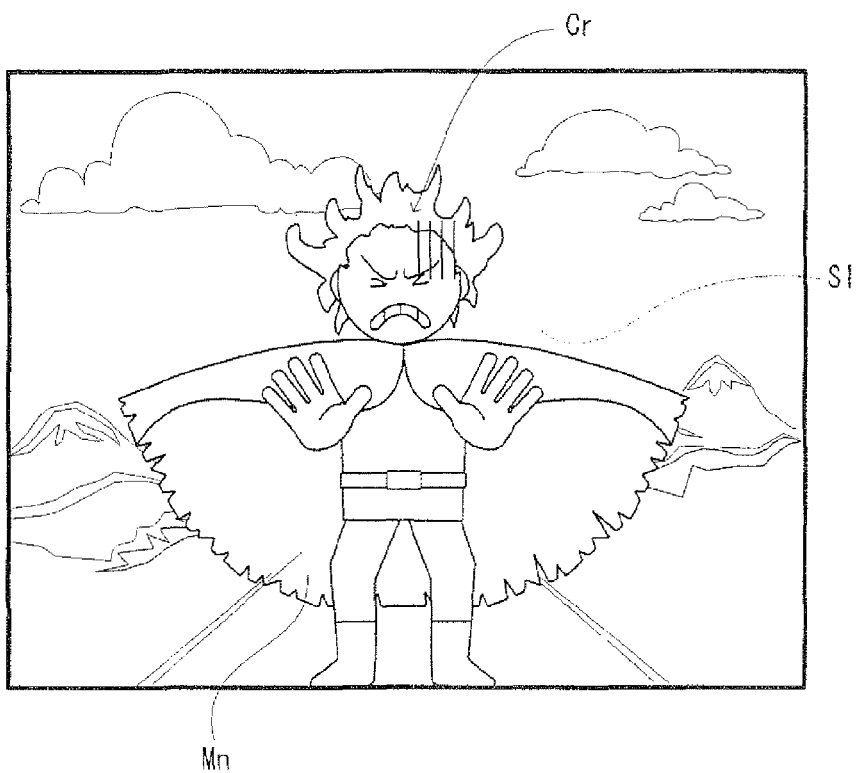

When a certain kind of game ("cloak blowing game", for example) is played in the game apparatus 10 configured as described above, the CPU 42 executes game processing on the basis of image data imaged by each of the cameras 16 and 18 and/or microphone input information input through the microphone 32. In a case of the "cloak blowing game" in this embodiment, the image data from the inward camera 16 and the microphone input information from the microphone 32 are utilized for the game processing. More specifically, a character that puts on a cloak is displayed on the LCD 14, and when the player blows some air on the character, a sound by the blowing is acquired by the microphone 32. The CPU 42 executes game processing on the basis of the microphone input information thus input from the microphone 32 to thereby cause a change within the display screen as if the cloak of the character is blown off by the breath of the player. One example of the change of the screen of the "cloak blowing game" is shown in FIG. 6. FIG. 6(A) shows a screen at the beginning of the game in which a cloak Mn of a character Cr is weighed down. FIG. 6(B) shows a screen at the progress of the game in which the cloak Mn is going to be flown as a result of the blowing the breath. Here, the shaded area in FIG. 6 is a silhouette S1 indicating a part of a skin color of the face of the user (skin color region).

However, in the crowded place and windy outdoor, the voice of others except for the user and a sound of wind are also acquired by the microphone 32, so that the game may advance without the user blowing his or her breath. Thereupon, in this embodiment, the presence or absence of the user is determined on the basis of the image data from the inward camera 16, and even if a sound input is detected, in a case that the user is not present, the game is not advanced. The presence or absence of the user is determined on the basis of a ratio (hereinafter referred to as "skin color ratio") of a skin color region to an object region Ed within the game screen (imaged region Ep) (see FIG. 10). Here, the presence or absence of the user may not be determined on the basis of the ratio of the skin color region to the object region Ed within the game screen (imaged region Ep), and any method can be available if the determination is made based on the size of the skin color regions calculated on the basis of the image data from the inward camera 16.

Figure 7:
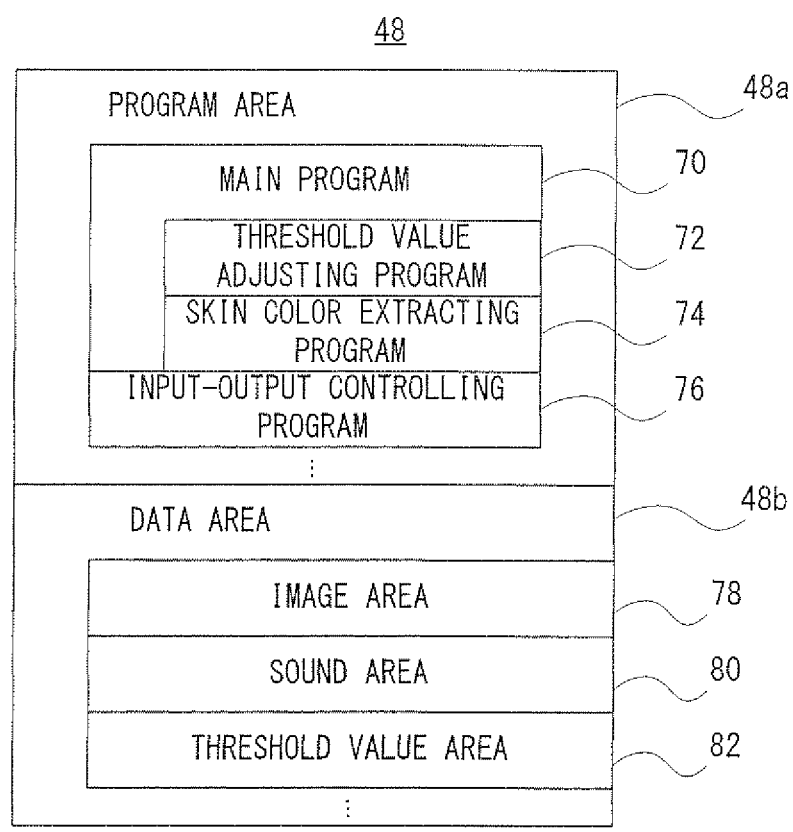
FIG. 7 is an illustrative view showing one example of a memory map.

FIG. 7 shows a memory map in a case that the cloak blowing game is played. Referring to FIG. 7, the main memory 48 is formed with a program area 48*a* and a data area 48*b*, and in the program area 48*a*, a main program 70 corresponding to flowcharts in FIG. 12-FIG. 17 is stored. The main program 70 includes a threshold value adjusting program 72 corresponding to the flowchart in FIG. 15 and FIG. 16, and a skin color extracting program 74 corresponding to the flowchart in FIG. 17 as subroutines. In the program area 48*a*, an input-output controlling program 76 for inputting and outputting an image and a sound by controlling the I/F circuit 40, etc. is also stored. On the other hand, the data area 48*b* includes an image area 78, a sound area 80, a threshold value area 82, etc. The image area 78 temporarily stores image data from the respective cameras 16 and 18, and the sound area 80 temporarily stores audio data (microphone input information) from the microphone 32. The threshold value area 82 stores a threshold value for extracting the skin color.

Figure 12:
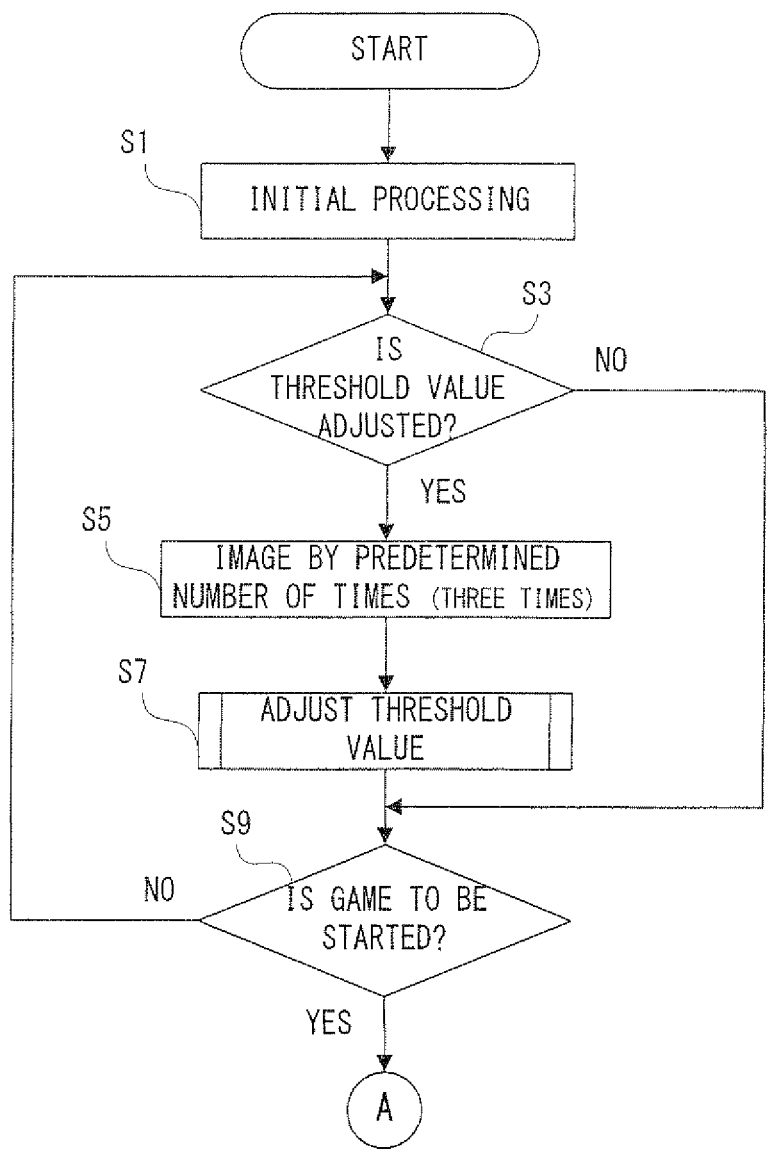
FIG. 12 is a flowchart showing a part of an operation by a CPU.
Figure 13:
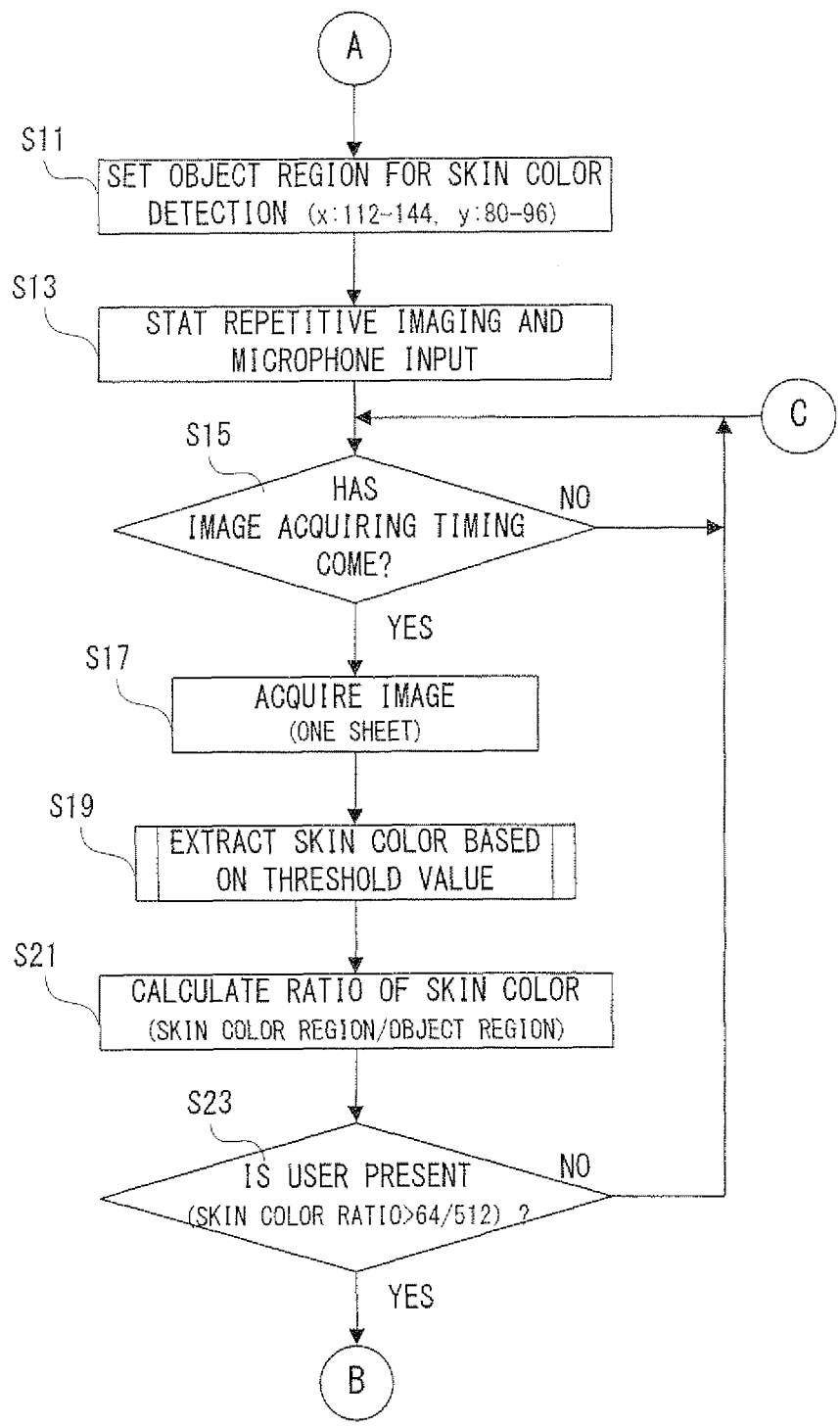
FIG. 13 is a flowchart showing another part of the operation by the CPU.
Figure 14:
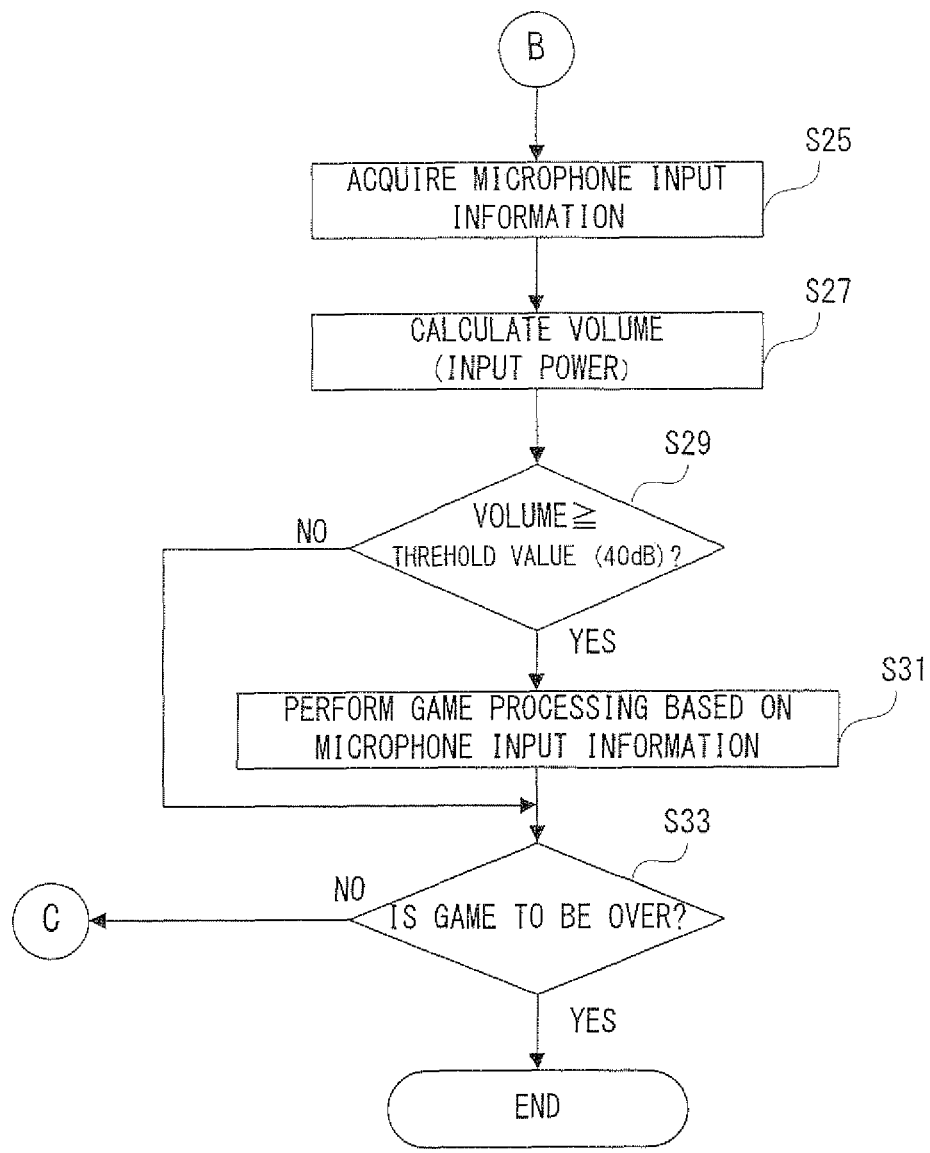
FIG. 14 is a flowchart showing a still another part of the operation by the CPU.
Figure 15:
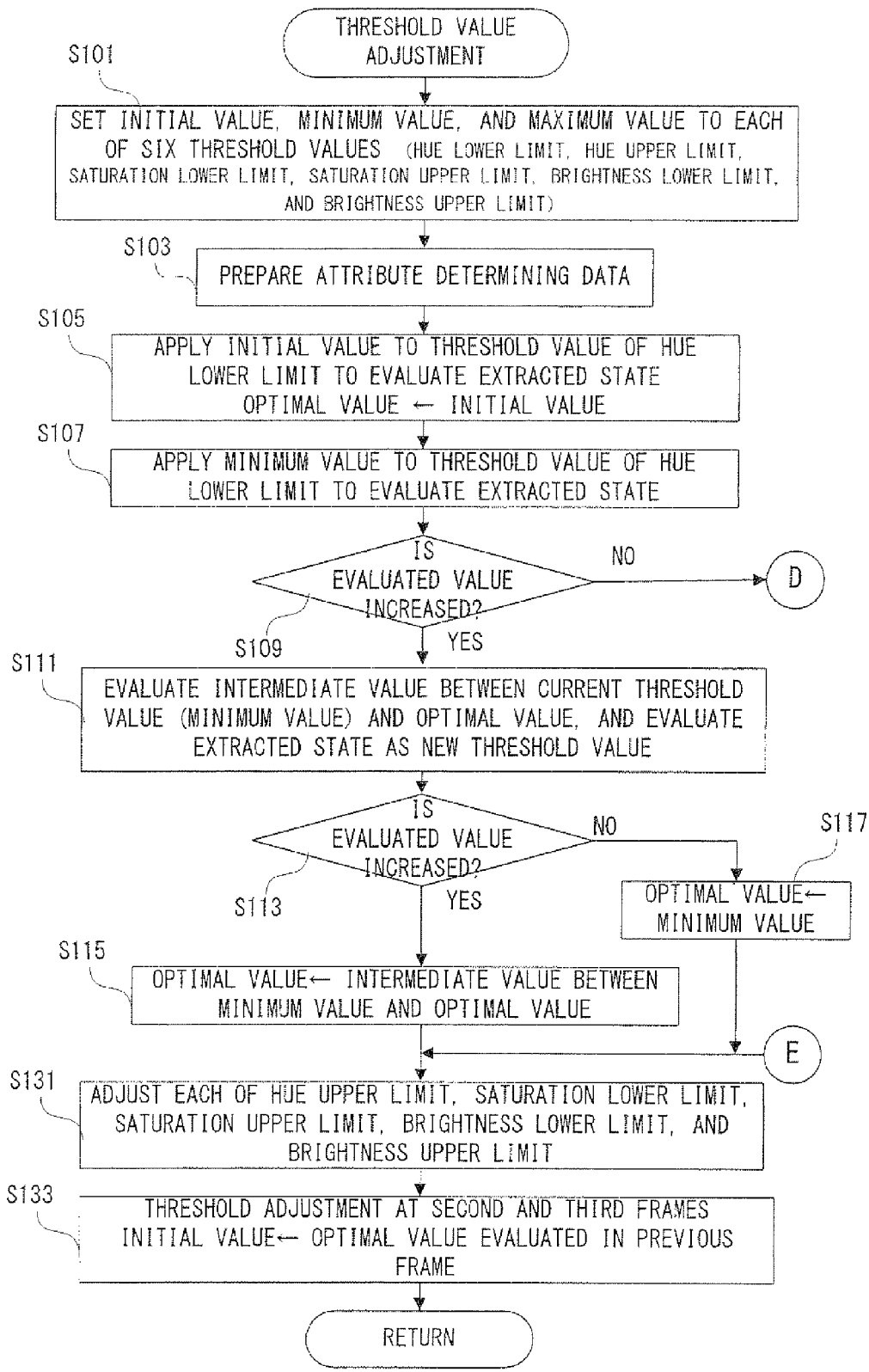
FIG. 15 is a flowchart showing a further part of the operation by the CPU.
Figure 16:
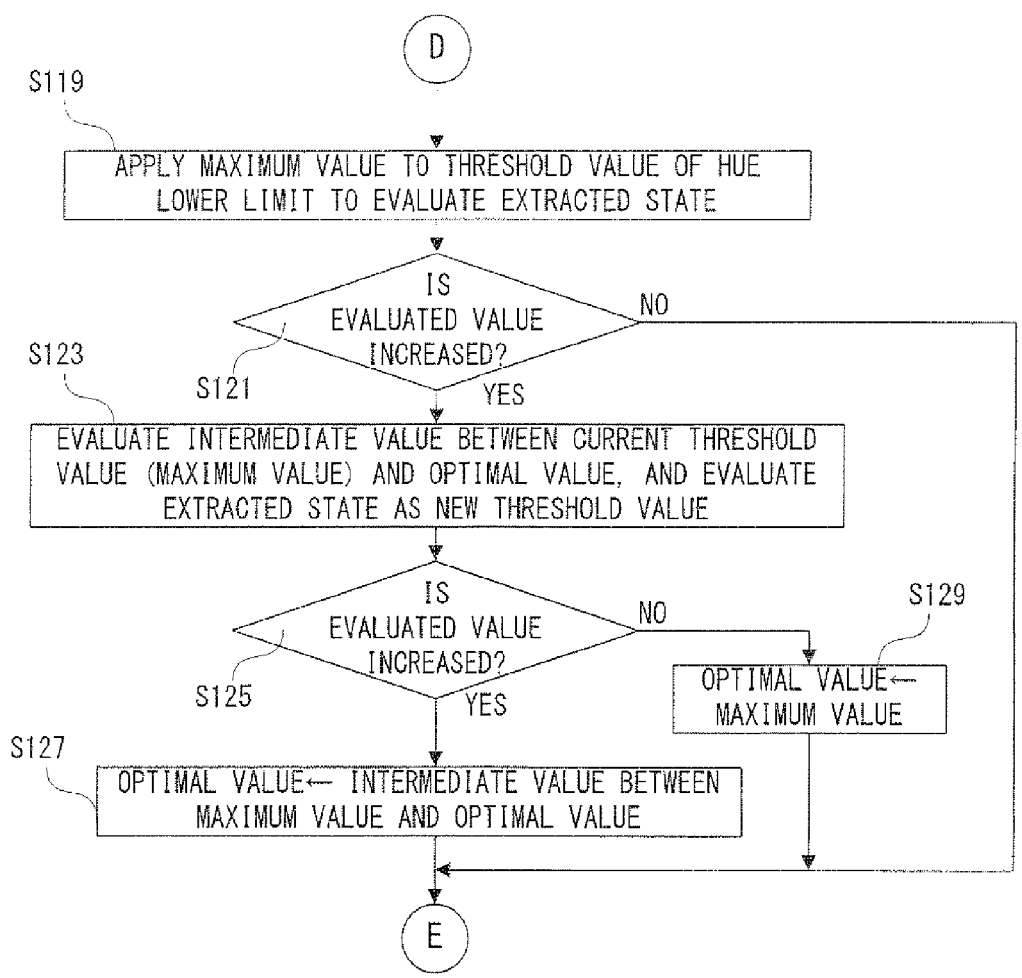
FIG. 16 is a flowchart showing a still further part of the operation by the CPU.
Figure 17:
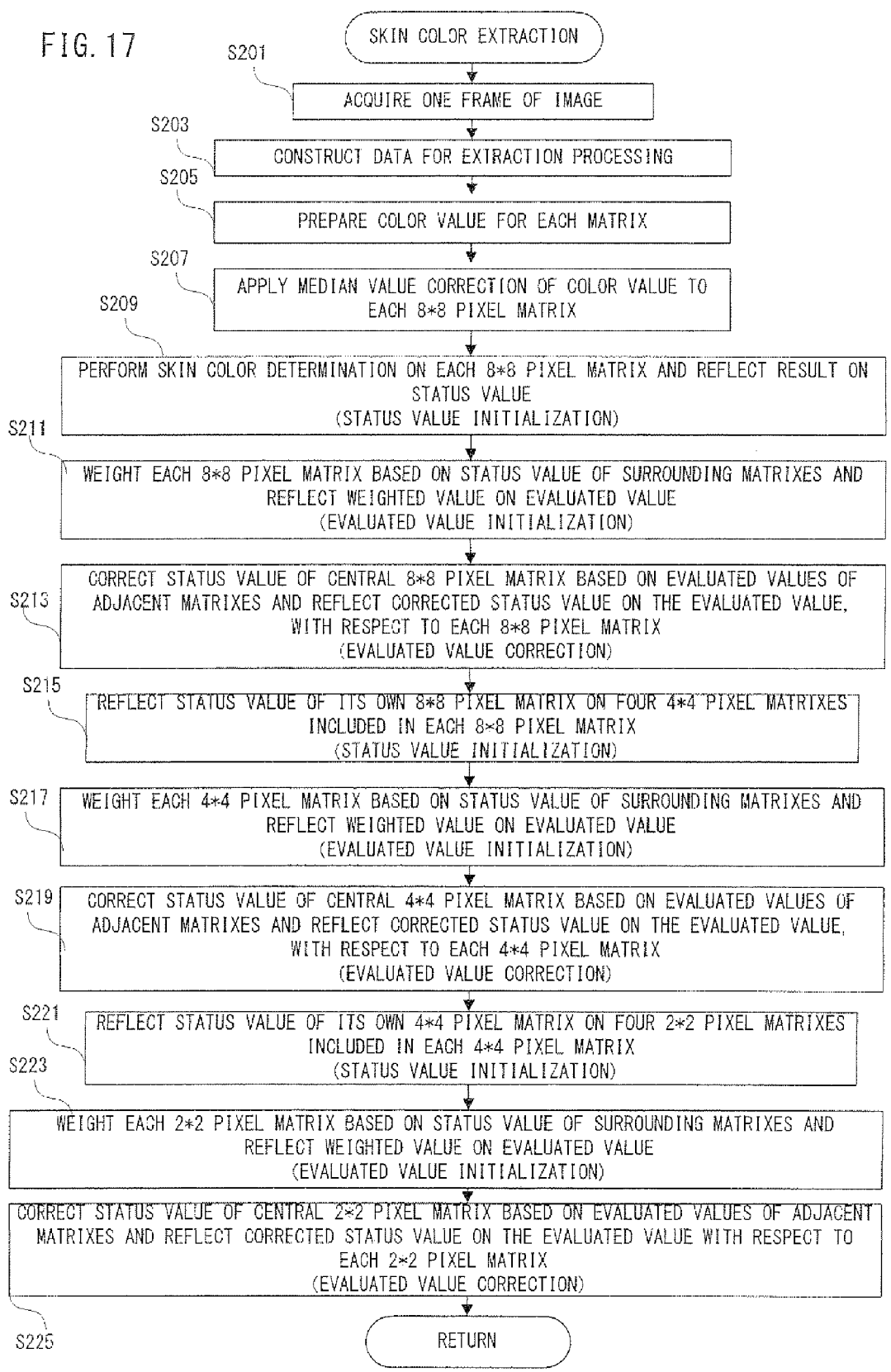
FIG. 17 is a flowchart showing another part of the operation by the CPU.

Referring to FIG. 12-FIG. 14, when the game is started, the CPU 42 executes initial processing in a step S1. The initial processing includes processing, such as initialization of the skin color threshold value and clearing of the image area 78 and the sound area 80. In a next step S3, it is determined whether or not threshold value adjustment for extracting a skin color is performed, and if "NO", the process proceeds to a step S9. For example, after completion of the threshold value adjustment processing described later, a threshold value adjusting flag is turned on, and if the threshold value adjustment has already been performed in the step S3, "NO" is determined in the step S3. When an operation indicating execution is performed by the operating portion 24, "YES" is determined in the step S3, and the process proceeds to a step S5. In the step S5, after a plurality of imaging commands, three times, here, are issued, three sheets of images are acquired from the image area 78 of the main memory 48.

Figure 8:
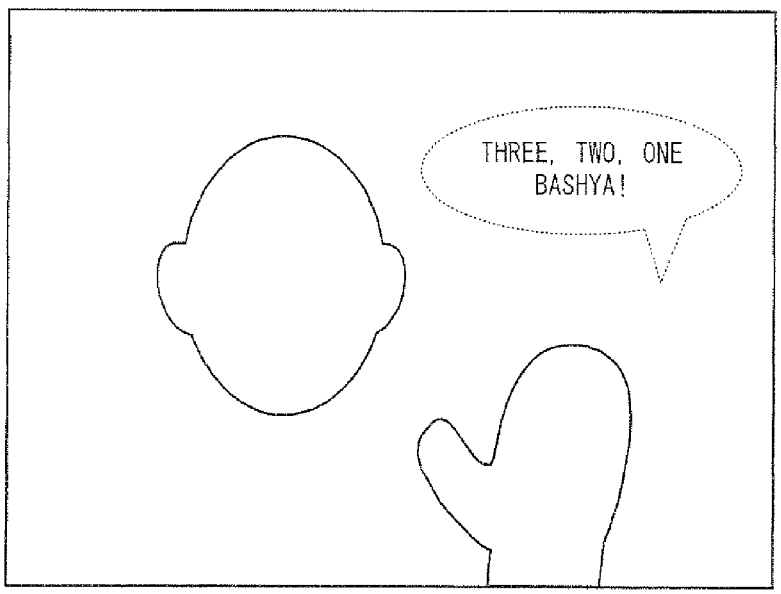
FIG. 8 is an illustrative view showing one example of a preliminary-imaged screen.

Here, the imaging command is issued in a state that the user makes a predetermined pose. The predetermined pose, here, is a pause of raising the right hand beside the face, for example. In a state that a guide image for such a pose (a face outline image and a hand outline image in FIG. 8) is displayed, by outputting a sound to inform the imaging timing, like "3, 2, 1, basya", and repetitively issuing imaging commands between "1" and "bashya", a plurality of imaging can be performed in a state that the user make a predetermined pose.

It should be noted that one of the images thus imaged is displayed on the LCDs 12 and 14 to be proposed to the player. Thus, the imaged image can be used as a certification image indicating who plays (played) the game. In another embodiment, the image for threshold value adjustment may be only one. However, by increasing the number of sheets, it is possible to homogenize the threshold values even if the color and the brightness of the screen are changed by automatic compensation processing, etc.

In a next step S7, threshold values for skin color extraction are adjusted so as to fit for the feature of the skin color of the user on the basis of the acquired three sheets of the images. After the adjustment, the process proceeds to the step S9. Here, the detail of the threshold value adjustment processing is described later.

Figure 10:
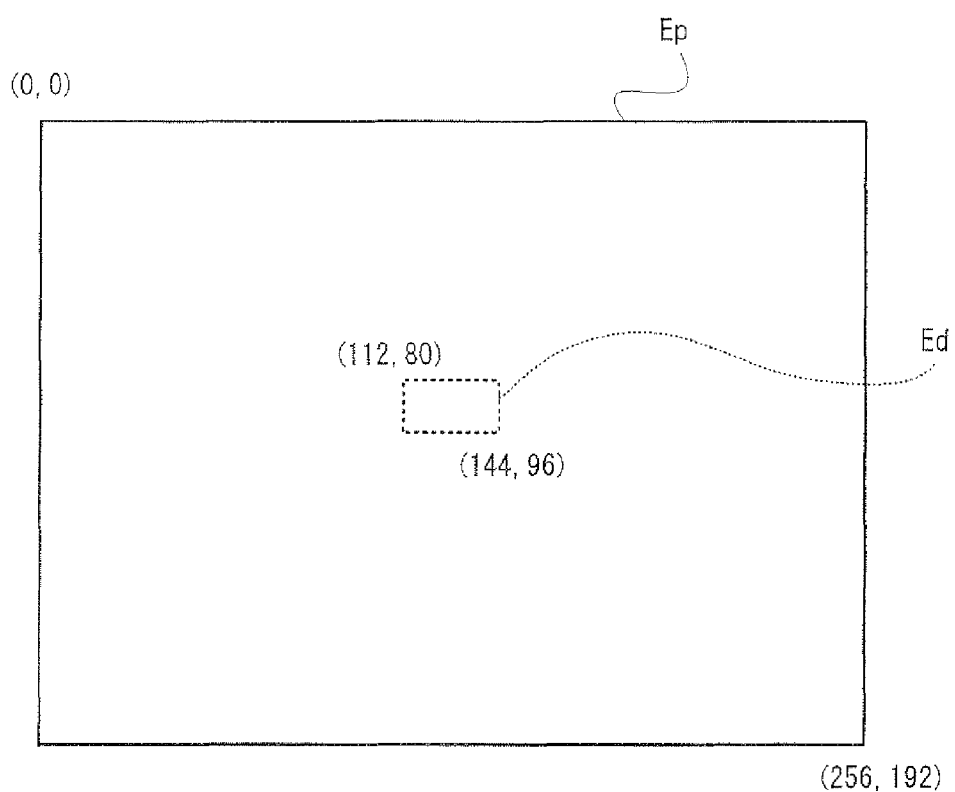
FIG. 10 is an illustrative view showing an object region for skin color detection set within an imaged region.

In the step S9, it is determined whether or not the game is to be started, and if "NO", the process returns to the step S3. When an operation, indicating a start is performed by the operating portion 24, "YES" is determined in the step S9, and the process proceeds to a step S11 to set the object region for skin color detection (Ed). Here, as shown in FIG. 10, a rectangular region (112, 80)-(144, 96) located at approximately the center of the imaged region Ep (0, 0)-(256, 192) is set as an object region Ed. That is, the object region Ed in this embodiment has a size of 32 dots in horizontal*16 dots in vertical=512 dots. Here, the shape of the object region Ed is not restricted to a rectangle, and may take a circle, an oval, and a polygon, such as an equilateral hexagon, etc. The size and position of the object region Ed may be changed as necessary. Furthermore, the object region is not necessarily fixed, and in another embodiment, this may be variably set by the user.

Then, the process proceeds to a step S13 to perform repetitive imaging (through image) and issue a microphone input starting command. In response thereto, a repetitive imaging by the camera and a voice input by the microphone 32 are started. Each frame of the image acquired through the repetitive imaging is written to the image area 78 of the main memory 48, and the microphone input information (audio data) obtained by the microphone input is written to the sound area 80 of the main memory 48. In this embodiment, the repetitive imaging and the microphone input are started at approximately the same time, but the microphone input may be started before the repetitive imaging. Here, the image area 78 has a size capable of storing a predetermined number of frames (30 frames, for example), and out of the images in the image area 78, the image in the oldest frame is overwritten by that in the latest fame. The sound area 80 also has a size capable of storing microphone input information equivalent to 30 frames, and out of the microphone input information within the sound area 80, microphone input information corresponding to the oldest frame is overwritten by the microphone input information corresponding to the latest frame. Accordingly, the image area 78 and the sound area 80 constantly store the images of the previous 30 frames and the microphone input information corresponding thereto.

In a next step S15, it is determined whether or not an image acquiring timing has come with reference to an output from the RTC 60, and if "NO", the process is waited. For example, if an image is acquired for each frame, "YES" is determined in the step S15 every lapse of 1/60 seconds, and the process proceeds to a step S17 to obtain one frame of image from the image area 78.

In a next step S19, a skin color image is extracted from the acquired image on the basis of the skin color threshold value. The detail of the skin color extracting processing is described later. Then, in a step S21, a ratio of the skin color region to the object region Ed is calculated, and in a step S23, the presence or absence of the user is determined on the basis of the calculation result. If the calculation result is larger than the threshold value, i.e., 64/512, "YES" is determined in the step S23, and then, the process proceeds to a step S25. If the calculation result is equal to or less than 64/512, "NO" is determined in the step S23, and the process returns to the step S15 to repeat the similar processing.

In the step S25, microphone input information equivalent to one frame is acquired from the sound area 80 of the main memory 48. Then, in a step S27, a volume (input power) is calculated on the basis of the acquired microphone input information, and then, it is determined whether or not the calculation result is equal to or more than a threshold value (40 dB, for example) in a step S29. If "YES" in the step S29, game processing based on the microphone input information is executed in a step S31, and then, the process proceeds to a step S33. On the other hand, if "NO" in the step S29, the game process in the step S31 is skipped, so that the process in the next step S33 is performed directly.

In the step S33, it is determined whether or not a game end condition is satisfied. The game end condition includes three conditions, "the game is successful", "the game is unsuccessful" and "the end operation is performed", and if any one of them is satisfied, "YES" is determined in the step S33 to end the game. If neither three conditions are satisfied, "NO" is determined in the step S33, and the process returns to the step S15 to perform similar processing.

In this embodiment, for determining whether the game is successful or unsuccessful, an evaluated value indicating the degree of progress of the game is introduced. The evaluated value is stored in the main memory 48, and is initialized (=0) in the initial processing of the step S1, and then incremented when "YES" is first determined in the step S29. Then, if "YES" in the step S29 as well 18 frames after the first increment (after about 0.2 seconds), the evaluated value is further incremented. If "NO" at this time, the evaluated value is decremented (the value at this time may be maintained in another embodiment). Thereafter, similar processing is repeated each 18 frames, and when the evaluated value reaches "5", it is determined that the game is successful. If a predetermined time (1 minute, for example) elapses before the evaluated value reaches "5", it is determined that the game is unsuccessful.

Accordingly, on the game screen shown in FIG. 6(A), when "YES" is first determined in the step S29, the cloak Mn starts to ride up, and every time that "YES" is determined in the step S29 thereafter (every 0.2 seconds), the cloak Mn starts to ride up step by step. Then, when "YES" in the step S29 continues for one second, the game screen shown in FIG. 6(B) is displayed, and directly after it, the cloak Mn is blown, which means that the game is successful.

Next, the threshold value adjustment processing in the step S7 described above is explained in detail. In this embodiment, the threshold value for skin color extraction includes six threshold values of a hue lower limit, a hue upper limit, a saturation lower limit, a saturation upper limit, a brightness lower limit and a brightness upper limit. Each of the six threshold values is adjusted on the basis of the three frames of images (image data for evaluation) acquired in the step S5 in a procedure shown in FIG. 15 and FIG. 16. The processing in each of the steps S101-S133 is explained below.

(S101)

First, an initial value, a minimum value and a maximum value (either is static value) are set for each six threshold value. More specifically, with respect to the threshold value of the hue lower limit, the initial value is set to 220, the minimum value is set to 210 and the maximum value is set to 230, and with respect to the threshold value of the hue upper limit, the initial value is set to 25, the minimum value is set to 21, and the maximum value is set to 30. With respect to the threshold value of the saturation lower limit, the initial value is set to 17, the minimum value is set to 10 and the maximum value is set to 30, and with respect to the threshold value of the saturation upper limit, the initial value is set to 114, the minimum value is set to 60 and the maximum value is set to 213. With respect to the threshold value of the brightness lower limit, the initial value is set to 15, the minimum value is set to 7 and the maximum value is set to 68, and with respect to the threshold value of the brightness upper limit, the initial value is set to 180, the minimum value is set to 152 and the maximum value is set to 232.

It should be noted that with respect to the hue, the processing is performed by values taken by converting the angle of 360 into 256 (being equal to or more than 0 and less than 256) levels. That is, 256 is equivalent to 0, and the hue is circulated like 0→1→ . . . →255→0→1→ . . . . In a case of the initial values of the hue, the hue lower limit is 220, and the hue upper limit is 25, so that the extraction range as a skin color becomes 220, 221, 222, . . . , 254, 255, 0, 1, . . . , 24, 25.

(S103)

Next, the Data (Static Data) Corresponding to the Guide Image to be Displayed in imaging in the step S5 is prepared as attribute determining data. The attribute determining data is specifically for indicating by data to which attribute each pixel at each position within the screen belongs out of three kinds below (two dots accuracy, here), and is previously, set and stored in the program as data.

Attribute A . . . pixel to be a skin color
Attribute B . . . pixel not to be a skin color
Attribute C . . . either (is irrelevant to the evaluation)

Figure 9:
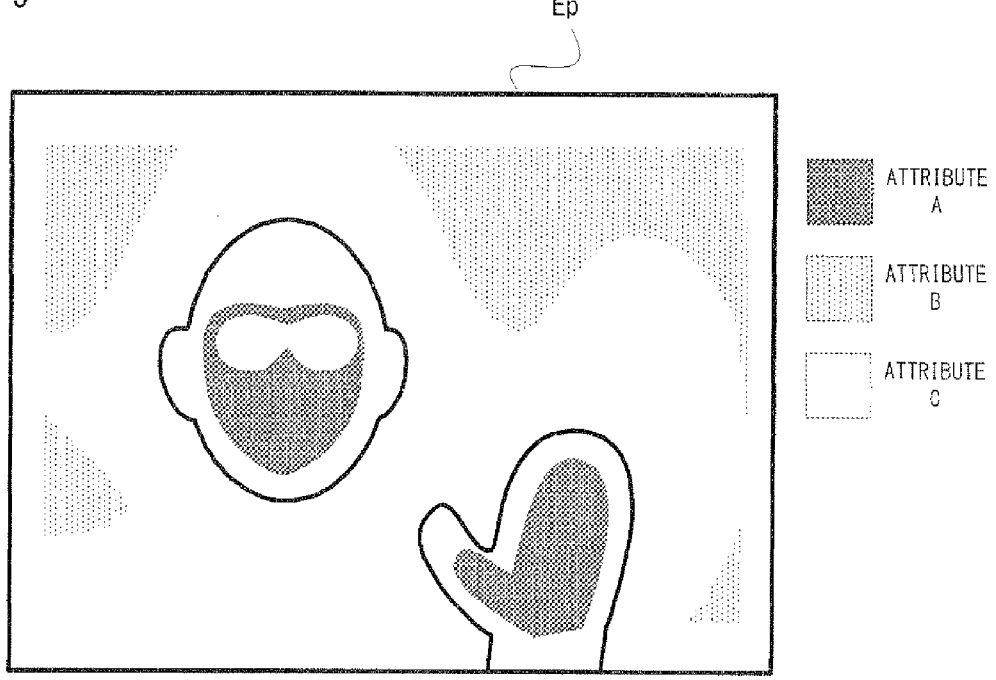
FIG. 9 is an illustrative view showing one example of attribute data to be referred at a time of a preliminary imaging.

FIG. 9 shows one example of the attribute determining data. Referring to FIG. 9, the dark shaded part corresponds to the attribute A, the light shaded part corresponds to the attribute B, and the no shaded part corresponds to the attribute C.

Next, one of the acquired three frames of images is selected as image data for evaluation. Then, the process proceeds to a step S105.

(S105)

The Initial Value (=220) is Applied to the Threshold Value of the Hue Lower Limit, and this initial value is regarded as a current optimal value. Then, the image data for evaluation (for each 4 dots) is compared with the attribute determining data to thereby evaluate an extracted state of the skin color. The evaluation processing is specifically performed below. With respect to the part of the attribute A of the attribute determining data, it is determined whether or not the corresponding part of the image data for evaluation is surely a skin color, and the number of dots included in the part for which the skin color is certainly determined is a value A. With respect to the part of the attribute B of the attribute determining data, it is determined whether or not the corresponding part of the image data for evaluation is erroneously a skin color, and the number of dots in the part for which the skin color is erroneously determined is a value B. With respect to the part of the attribute C, the determinations need not to be especially performed. The value B is subtracted from the value A thus evaluated, and the result of the subtraction is regarded as an evaluated value. As the evaluated value is large, it is considered that the skin color is extracted more suitably.

(S107)

Next, the minimum value (=210) is applied to the threshold value of the hue lower limit to perform similar evaluation processing.

(S109)

It is determined whether or not the evaluated value thus obtained is larger than the previous (that is, the evaluated value when the initial value is applied to the threshold value) evaluated value. The process branches into two, that is, steps S111-S117 and steps S119-S129 according to the determination result.

(S111-S117)

In a case that the evaluated value is increased in the S109, an intermediate value (average value, for example) between the current threshold value (that is, minimum value) and the current optimal value (that is, initial value) is evaluated, and similar evaluation processing is performed by taking the evaluated intermediate value as a new threshold value. The evaluated value thus obtained is compared with the previous evaluated value (that is, the evaluated value when the minimum value is applied to the threshold value), and the threshold value (that is, any one of the "minimum value" and "the intermediate value between minimum value and the optimal value") for which the higher evaluated value can be obtained is adopted as a current optimal value. Then, the process proceeds to the steps S131 and S133.

(S119-S129)

If the evaluated value is not increased in the S109, that is, maintains the status quo or decreased, the maximum value (=230) is applied to the threshold value of the hue lower limit to perform similar evaluation processing. Here, the process branches into two as well. If the current evaluated value is increased from the previous evaluated value, the intermediate value between the current threshold value (that is, maximum value) and the current optimal value (that is, initial value) is evaluated, and similar evaluation processing is performed by regarding the evaluated intermediate value as a new threshold value. The evaluated value thus obtained is compared with the previous (that is, the evaluated value when the minimum value is applied to the threshold value) evaluated value, and the threshold value for which the higher evaluated value can lie obtained (that is, any one of the "maximum value" and the "intermediate value between the maximum value and the optimal value") is adopted as a current optimal value. On the other hand, if the current evaluated value is decreased below the previous evaluated value, or maintains the status quo, the original optimal value (that is, initial value) is consequently suitable, and thus is decided as it is. Then, the process proceeds to the steps S131 and S133.

(S131)

Thereafter, processing similar to the aforementioned steps S105-S129 is executed as to each of the threshold values, such as the hue upper limit, the saturation lower limit, the saturation upper limit, the brightness lower limit, and the brightness upper limit, to thereby select a more suitable value.

(S133)

With respect to the rest of each of the two sheets of image, similar processing is repeated. Noted that in the processing at the second frame, the optimal value evaluated in the processing at the first frame is taken as an initial value, and in the processing at the third frame, the optimal value evaluated in the processing at the second frame is taken as an initial value.

Each of the six threshold values is adjusted to the optimal value according to aforementioned processing.

Accordingly, in this embodiment, by utilizing the photograph image acquired by imaging the player prior to the start of the game, the threshold values for determining the skin color of the player in the current environment (sunlight condition, etc.) is adjusted. This makes it possible to correctly detect the skin-color during the game.

Furthermore, in this embodiment, the threshold value-based adjusting processing is executed by utilizing the plurality of imaged images. This makes it possible to correctly adjust the threshold values. Moreover, evaluation processing with respect to the n+1-th imaged image is performed based on the threshold value optimized by the n-th imaged image. This makes it possible to effectively adjust the threshold values.

In addition, in this embodiment, the threshold values are adjusted with respect to each of the hue, the saturation, and the brightness, and therefore, it is possible to accurately set the threshold values in the environment at this time. However, only the hue and the saturation may be adjusted, or only the hue and the brightness may be adjusted.

Furthermore, the region which should not be a skin color may be determined as well as the region which should be a skin color. This makes it possible to accurately set the threshold values.

It should be noted that in this embodiment, the threshold value adjustment processing is performed before the start of the game, but in place of this or in addition to this, one or plurality of the threshold value adjustment processing may be performed in the course of the game. Furthermore, the threshold values and the acquired number of frames set forth here are merely one example; and may be changed as necessary.

Next, the skin color extracting processing in the aforementioned step S19 is explained in detail. In this embodiment, on the basis of the threshold values after the adjustment processing described above, a skin color region is extracted from each frame of image according to a procedure shown in FIG. 17. The processing in each of the steps S201-S225 is explained below.

(S201)

First, one frame of image is acquired from the image area 78 of the main memory 48 by the API (Application Program Interface). This image has a size of 256*192 dots, and is conform to RGB (ach component is five bits) format.

(S203)

Next, data for extraction processing is constructed on the basis of the acquired image. This data is generated so as to correspond to the three kinds of the matrix regions 8*8, 4*4 and 2*2 (hereinafter, referred to as an "8×8 pixel matrix", a "4×4 pixel matrix", and a "2×2 pixel matrix"). That is, from the 256*192 pixel image, the 8×8 pixel matrix of 768 (=32*24), the 4×4 pixel matrix of 3072 (=64*48), and the 2×2 pixel matrix of 12288 (=64*48) are generated.

Here, each matrix data includes information on an evaluated value, a status value and a color value. The evaluated value is described by 8 bits, and indicates skin color-likeness (However, out of 8 bits, 0-64 is used for evaluation and 255 means invalidity). Furthermore, the larger the evaluated value is, the more the region means to be likely to the skin color. The status value is described by 16 bits, and indicates a determination result indicating the extracted condition and whether the skin color or not. The color value is described by 16 bits, and is conform to RGB555. Here, the color value is converted from the RGB555 format to a format of the three components of brightness, hue and saturation at a time of the data evaluation. The status value is data for holding a content (state) determined by each processing described later, and indicated by 16 bit data. More specifically, the status value is indicated by one bit information showing whether the skin color or not, 8 bit information showing whether or not each of the surrounding 8 matrixes is the skin color, one bit flag for forcedly regarding the own matrix as being a skin color, and one bit flag for forcedly regarding the own matrix as not being a skin color, being added with extra 5 bits.

(S205)

Succeedingly, a color value is prepared to each of the matrixes. More specifically, first, with respect to each 2*2 pixel matrix, an average color value is evaluated from the four pixels included therein, and this value is regarded as a color value of this matrix. Next, with respect to each 4*4 pixel matrix, an average color value is evaluated from the color values (that is, four color values) set in four 2*2 pixel matrixes which are included therein, and this value is regarded as the color value of the matrix. Lastly, with respect to each 8*8 pixel matrix, an average color value is evaluated from the color values (that is, four color values) set in four 4*4 pixel matrixes which are included therein, and this value is regarded as the color value of the matrix. Thus, it is possible to reflect the color values from the smaller matrixes to the larger matrixes.

(S207)

Next, a median value correction of the color value is applied with respect to each 8*8 pixel matrix. More specifically, with respect to nine 8*8 pixel matrixes including the 8*8 pixel matrix being to be noted and the surrounding eight 8*8 pixel matrixes, a median of the brightness included in the color values is evaluated, and the color value (that is, the color value whose brightness is the median out of the nine color values) corresponding thereto is regarded as a color value of the 8*8 pixel matrix to be noted. Thus, the surrounding color values are reflected on the color value of each 8*8 pixel matrix through the correction by the median.

(S209)

Next, the status value is initialized with respect to each 8*8 pixel matrix. That is, it is determined whether or not each matrix is a skin color on the basis of the threshold values adjusted by the above-described threshold value adjusting processing, and this result is reflected on the status value. More specifically, it is selected (determined) whether each of the brightness, hue, and saturation is within or out of the range of the threshold on the basis of the color value prepared and corrected as described above.

(S211)

Next, the evaluated value is initialized with respect to each 8*8 pixel matrix according to next processing, that is, the surrounding 8*8 pixel matrixes are weighted on the basis of the status values of the surrounding matrixes, and the weighted values are reflected on the evaluated value. More specifically, assuming that the matrix for which the determination result based on the threshold value is within the threshold value is regarded as "1", and assuming that the matrix for which the determination result based on the threshold value is out of the threshold value is regarded as "0", by multiplying each of the values of the corresponding matrix with a weighting factor (coefficient) and summing up the weighted values, the evaluated value of the central matrix is calculated. Where the weighting factor for each matrix is Wi (i is a number applied to matrix: 1-9), and the determination result based on the threshold value for each matrix is Hi, the evaluated value Y of the central matrix is evaluated according to a following equation.

$$Y = W1*H1 + W2*H2 + W3*H3 + W4*H4 + W5*H5 + W6*H6 + W7*H7 + W8*H8 + W9*H9$$

Accordingly, assuming that the weighting factor as shown in FIG. 11(A), for example, is prepared in the memory for preset data 54, and the result shown in FIG. 22 is obtained from the determination based on the threshold value, the evaluated value Y of the central matrix is calculated on the basis of the aforementioned equation in the following manner.

$$Y=(0/64)*0+(10/64)*0+(0/64)*1+(10/64)*0+(24/64)\\*1+(10/64)*1+(0/64)*0+(10/64)*1+(0/64)*0=44/64$$

Here, in this embodiment, a single grid as shown in FIG. 11(A) is weighted, but in another embodiment, a double grid as shown in FIG. 11(B) or a triple grid shown in FIG. 11(C) may be weighted. In addition, a quadruple grid or more may be weighted, or a grid which is not weighted may be possible as one embodiment.

(S213)

Next, with respect to each 8*8 pixel matrix, the evaluated value is corrected according to the following process. That is, on the basis of the evaluated values Y of the adjacent 8*8 pixel matrixes, the status value of the central 8*8 pixel matrix is corrected so as to be reflected on the evaluated value.

More specifically, if each of the evaluated values Y of the surrounding eight 8*8 pixel matrixes is equal to or more than 20, it is considered that the surrounding (peripheral) 8*8 pixel matrixes are satisfied with the skin color, and irrespective of the initialized evaluated value Y of its own 8*8 pixel matrix, the evaluated value Y of its own 8*8 pixel matrix is regarded as being a skin color as well. That is, in the status value, the flag for forcedly regarding its own 8*8 pixel matrix as being a skin color is turned on.

On the other hand, if each of the evaluated values Y of the surrounding eight 8*8 pixel matrixes is less than 20, it is considered that the surrounding (peripheral) eight 8*8 pixel matrixes are not a skin color, and irrespective of the initialized evaluated value Y of its own 8*8 pixel, the evaluated value Y of its own 8*8 pixel is regarded as not being a skin color (except for the skin color) as well. That is, in the status value, the flag for forcedly regarding its own 8*8 pixel as not being a skin color is turned on. If each of the evaluated values Y of the surrounding eight 8*8 pixel matrixes does not correspond to either case, that is, if out of the surrounding eight 8*8 pixel matrixes, the evaluated values Y of some of the matrixes are less than 20 and the evaluated values of the other matrixes are equal to or more than 20, the evaluated value Y of its own 8*8 pixel matrix is not corrected at all, and maintained as it is.

Noted that as described later, this evaluated value correcting processing is executed on each 4*4 pixel matrix and each 2*2 pixel matrix, but in a case that a matrix is forcedly regarded as being a skin color, or in a case that a matrix is forcedly regarded as not being a skin color at an upper level (larger matrix), the result in that level has a priority to the result at the lower level.

(S215)

Next, the status value of its own 8*8 pixel matrix is reflected on the four 4*4 pixel matrixes included in each 8*8 pixel matrix. More specifically, the status value of each of the 4*4 pixel matrixes is initialized according to the following processing. That is, the status value of the 8*8 is set to an initial value of the status value of each of 4*4 pixel matrixes included therein.

(S217)

Then, processing similar to the above description (S211) is performed on each 4*4 pixel matrix to thereby initialize the evaluated value. The duplicated explanation is omitted (and so forth).

(S219)

Next, processing similar to the above description (S213) is performed on each 4*4 pixel matrix to thereby correct the evaluated value.

(S221)

The status value of its own 4*4 pixel matrix is reflected on the four 2*2 pixel matrixes included in each 4*4 pixel matrix. More specifically, the status value of the 2*2 pixel matrix is initialized according to the following processing. That is, the status value of the 4*4 pixel matrix is set to an initial value of the status value of each of 2*2 pixel matrixes included therein.

(S223)

Next, processing similar to the above description (S211) or (S217) is performed on each 2*2 pixel matrix to thereby initialize the evaluated value.

(S225)

Then, processing similar to the above description (S213) or (S219) is performed on each 2*2 pixel matrix to thereby correct the evaluated value. Accordingly, by referring to the status values in a unit of 2×2 pixel matrix, it is possible to detect whether the skin color or not.

Extraction of the skin color image is performed on the basis of the evaluated value of each 2*2 pixel matrix thus evaluated. That is, the CPU 42 regards the region made up of 2*2 pixel matrixes for each of which the evaluated value indicates the skin color as a skin color region, and extracts the part of the image belonging to the skin color region from the image acquired in the step S17.

Thus, in this embodiment, out of the image acquired by imaging, with respect to each of the divided images of a relatively large size A (8×8 pixel matrix in the above-described example), determination processing as to whether a skin color or not, (specifically, processing for determining whether each of the brightness, the hue and the saturation of the color value is within the fixed range) is executed, and with respect to each matrix of the size A, the determination result ("status value" in the above-described example) is generated. Then, with respect to each matrix of a relatively small size B (4×4 pixel matrix in the above-described example), the processing is performed. More specifically, by means of the determination result of each matrix of the size A, the determination result of each matrix of the size B is set (above-described step S215.) Thus, there is not need of performing skin color determination processing (More specifically, processing for determining whether each of the brightness, the hue and the saturation of the color value is within the fixed range) with respect to each matrix of the small size. That is, it is possible to reduce a load on the processing. Then, the determination result of each matrix of the size B is corrected by utilizing the determination results of the surrounding matrixes (above-described processing S211 and S213). Thus, the determination result is changed in a unit of the size B smaller in size, so that it is possible to generate the determination results with a high resolution.

Furthermore, in this embodiment, in the matrix of the relatively large size A, with respect to the matrix having a high probability of being a skin color, (a matrix to which a "one bit flag for forcedly regarding its own matrix as being a skin color" is set in the above-described embodiment), even if the matrix is determined not to be a skin color in the matrix of the smaller size B included in the matrix of the size A, the entire matrix of the size A is determined to be a skin color. Thus, it is possible to reduce noise. Furthermore, similarly, in the matrix of the relatively large size A, with respect to the matrix having a low probability of being a skin color, (a matrix to which a "one bit flag for forcedly regarding its own matrix as not being a skin color" is set in the above-described embodiment), even if the matrix is determined to be a skin color in the matrix of the smaller size B included in the matrix of the size A, the entire matrix of the size A is determined not to be a skin color. Thus, it is possible to reduce noise.

As understood from the above description, according to this embodiment, the game apparatus 10 executes game processing on the basis of the microphone input information input through the microphone 32. The CPU 42 of the game apparatus 10 images the user (S13-S17), determines whether or not the user is detected on the basis of a skin color ratio of the image data indicating the image acquired by imaging (S23), and executes game processing on the basis of the microphone input information when it is determined that the user is detected (S31). Alternatively, when it is determined that the user is not detected, the game processing based on the microphone input information is not performed. Accordingly, while the user is not detected, the microphone input is made invalid, and while the user is detected, the microphone input is made valid, and therefore, it is possible to reflect an operation by an input through the microphone on the game processing as the user intended.

In the above-described embodiment, a skin color image is extracted from the acquired image on the basis of the skin color threshold value (step S19), calculates a ratio of the skin color region to the object region Ed (step S21), and determines the presence or absence of the user on the basis of the calculated result (step S23). However, this is not restricted thereto, and face recognition of the user is performed from the acquired image by utilizing the FSE (Face Sensing Engine). Then, if the eyes, the mouth, etc. of the user are detected as a result of the recognition, it may be determined that the user is present, and if the eyes and the mouth of the user are not detected, it may be determined that the user is absent.

Figure 18:
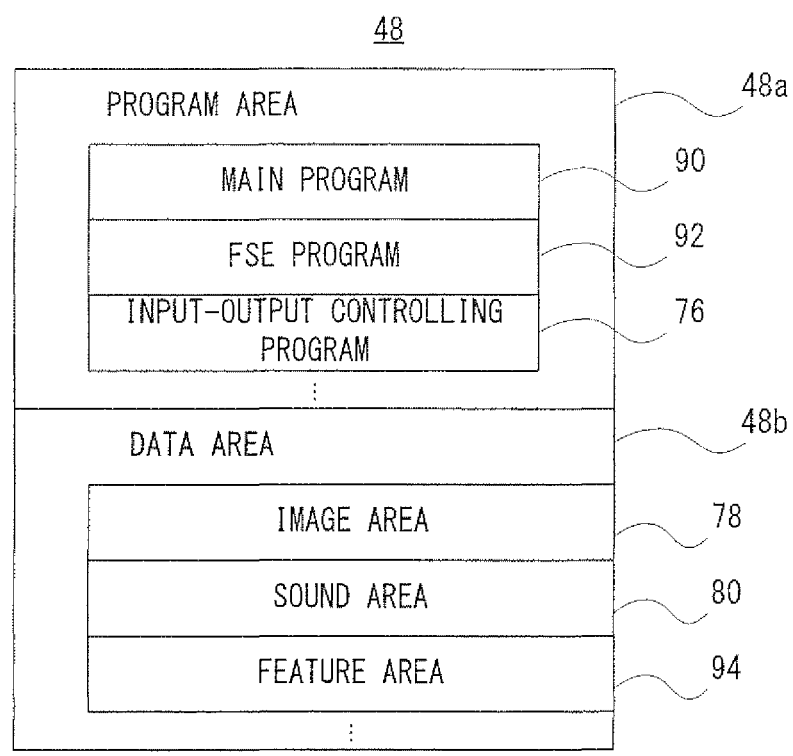
FIG. 18 is an illustrative view showing a memory map of another embodiment.

Additionally, in another embodiment, the presence or absence of the user may be determined on the basis of the detection result of the FSE. This embodiment has a configuration the same as that of the previous embodiment except for a part of the software. FIG. 18 shows a memory map in this case. Referring to FIG. 18, a program area 48a stores a main program 90 corresponding to flowcharts shown in FIG. 19-FIG. 21 and an FSE program 92 to be utilized by the main program 90. Here, the FSE program 92 may be the existing FSE program (detailed explanation is omitted). The program area 48a also stores an input-output controlling program 76, etc. similar to the previous embodiment. On the other hand, a data area 48b includes a feature area 94 in addition to an image area 78 and a sound area 80 similar to the previous embodiment. The feature area 94 stores feature data for face detection.

Figure 19:
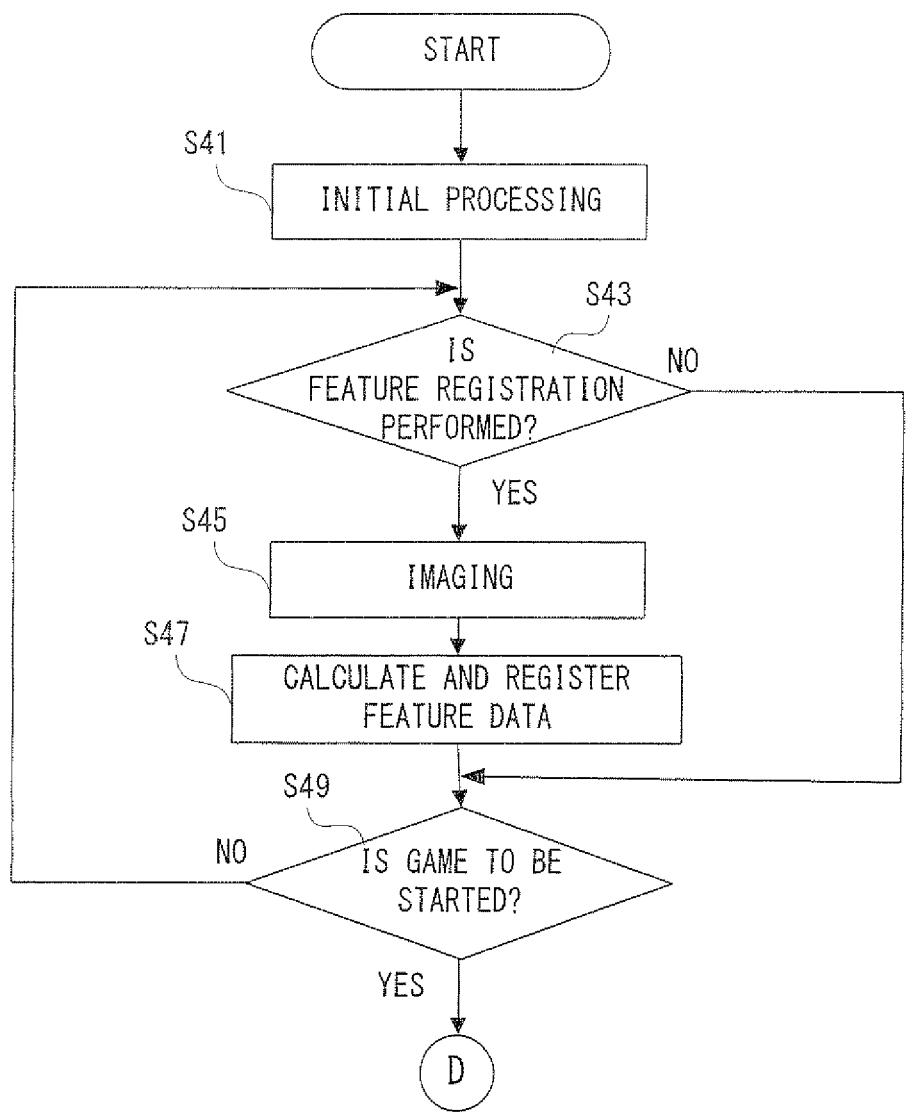
FIG. 19 is a flowchart showing a part of the operation by the CPU corresponding to FIG. 18 embodiment.
Figure 20:
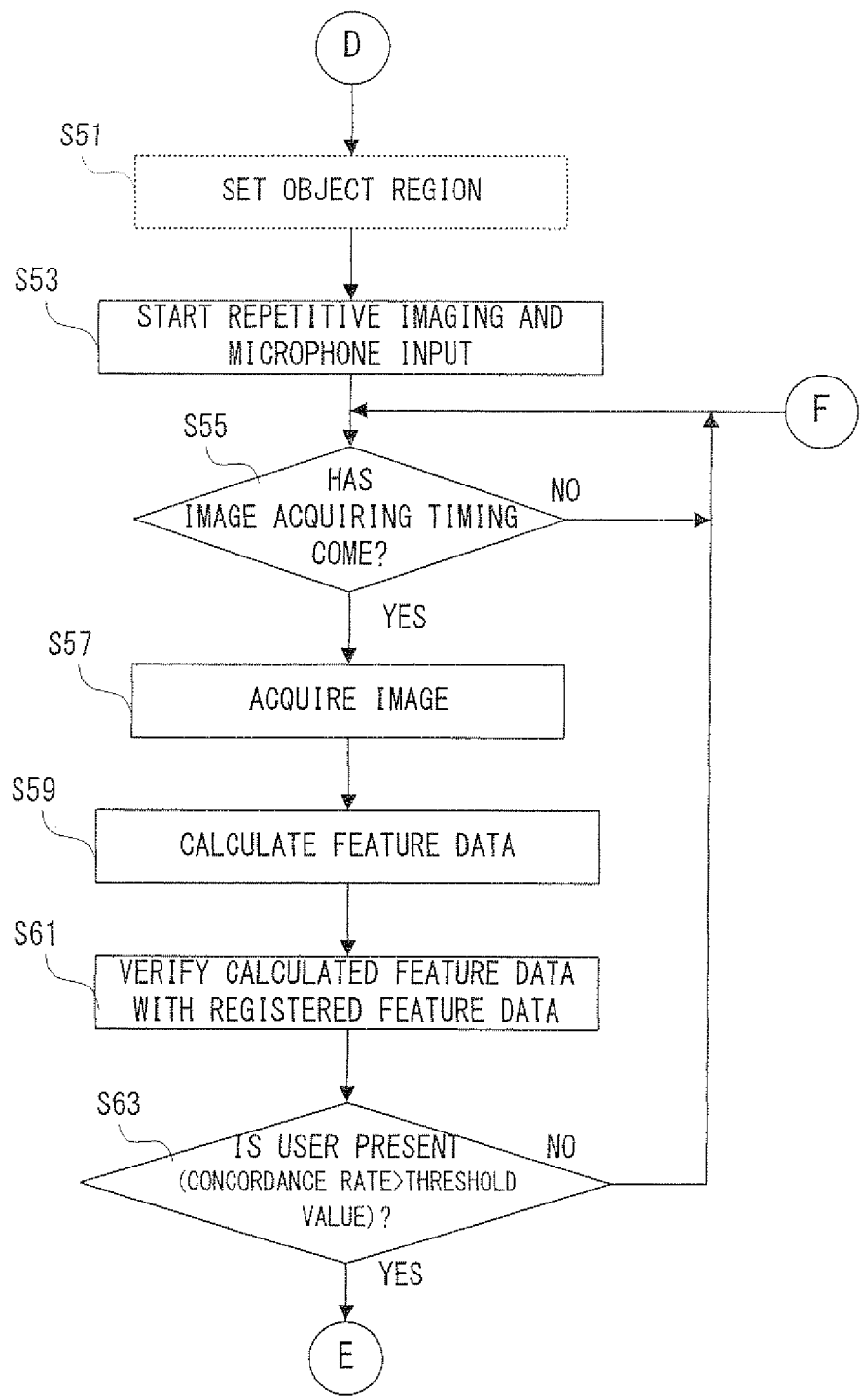
FIG. 20 is a flowchart showing another part of the operation by the CPU corresponding to FIG. 18 embodiment.

Referring to FIG. 19-FIG. 21, the CPU 42 executes initial processing in a step S41. The initial processing includes processing, such as initialization of the registered feature data and clearing the image area 78 and the sound area 80. In a next step S43, it is determined whether or not a feature registration for face detection is performed, and if "NO", the process proceeds to a step S47. When an operation indicating execution is performed by the operating portion 24, "YES" is determined in the step S43, and the process proceeds to a step S45. In the step S45, after an imaging command is issued, an image is acquired from the image area 78 of the main memory 48.

In the next step S47, feature data is calculated on the basis of the acquired image, and the calculated feature data is registered in the feature area 94. After the registration, the process proceeds to a step S49 to determine whether or not game is to be started, and if "NO", the process is waited.

When an operation indicating a start is performed with the operating portion 24, "YES" is determined in the step S49, and the process proceeds to a step S51 to set an object region for face detection (not illustrated) by the FSE. Here, the object region for face detection is generally set so as to be wider than the object region Ed for face color detection (see FIG. 10) ((80, 60)-(160, 120), for example). Alternatively, the face detection may be performed over the entire screen, and in this case, the step S51 is omitted.

In a next step S53, a starting instruction of the repetitive imaging (through image) and the microphone input is issued. In response thereto, repetitive imaging by the camera and a voice input by the microphone 32 are started at the same time. The image of each frame acquired by the repetitive imaging is written to the image area 78 of the main memory 48, and microphone input information (audio data) acquired by the microphone input is written to the sound area 80 of the main memory 48.

In a next step S55, referring to an output from the RTC 60, it is determined whether or not an image acquiring timing has come, and if "NO", the process is waited. When an acquiring timing has come, "YES" is determined in the step S15, and the process proceeds to a step S57 to acquire one frame of image from the image area 78.

In a successive step S59, feature data is extracted from the acquired image, and in a next step S61, the extracted feature data is verified with the registered feature data. Then, in a step S63, it is determined whether or not the user is present on the basis of the verification result, that is, the concordance rate between the extracted feature data and the registered feature data. If the concordance rate is above a threshold value (60%, for example), "YES" is determined in the step S63, and the process proceeds to a step S65. If the concordance rate is equal to or less than the threshold value, "NO" is determined in the step S63, and the process returns to the step S55 to repeat the similar processing.

The series of processing in steps S65-S73 is similar to those in the steps S25-S33 described above, and the explanation is omitted.

As understood from the above description, according to this embodiment, the game apparatus 10 executes the game processing on the basis of the microphone input information input through the microphone 32. The CPU 42 of the game apparatus 10 images the user (S53-S57), determines whether or not the user is detected on the basis of the feature data included in the image data indicating the image acquired by imaging (that is, according to the method of the FSE)(S63), and executes the game processing on the basis of the microphone input information when it is determined that the user is detected (S71). Alternatively, when it is determined that the user is not detected, the game processing based on the microphone input information is not performed.

Accordingly, while the user is not detected, the microphone input is made invalid, and while the user is detected, the microphone input is made valid, and therefore, it is possible to reflect an operation by an input through the microphone on the game processing as the user intended.

The game apparatus 10 is explained as one example in the above, but the example embodiments presented herein can be applied to a game apparatus having a microphone, a camera, and a computer (processor).

Although the present embodiments have been described and illustrated in detail, it is clearly understood that the same is by way of illustration and example only and is not to be taken by way of limitation, the spirit and scope of the present embodiments being limited only by the terms of the appended claims.

What is claimed is:

1. A non-transitory storage medium storing a game program, wherein
said game program causes a computer of a game apparatus that comprises a camera and a microphone to at least execute:
initiating imaging with said camera to input an image,
initiating inputting with said microphone to input microphone input information,
fetching an image that is imaged by said camera at an image fetching timing,
determining whether a user is detected on the basis of image data representing the fetched image,
fetching the microphone input information inputted in said initiating inputting with said microphone upon a determination that said user is detected, and
performing game processing based on said fetched microphone input information.

2. The non-transitory storage medium storing a game program according to claim 1, wherein
said determining determines whether or not said user is detected by determining whether or not a skin color of said user is detected on the basis of the image data representing the image obtained by said imaging.

3. The non-transitory storage medium storing a game program according to claim 2, wherein
said game program causes said computer to further execute skin color region calculating for calculating a size of a skin color region on the basis of the image data representing the image obtained through the imaging by said imaging, and
said determining determines that the skin color of said user is detected when the size of the calculated skin color region is equal to or more than a predetermined value.

4. The non-transitory storage medium storing a game program according to claim 3, wherein
said skin color region calculating calculates a ratio of the skin color to the image obtained through the imaging, and said determining determines that the skin color of said user is detected when the ratio calculated by said skin color region calculating is equal to or more than the predetermined value.

5. The non-transitory storage medium storing a game program according to claim 3, wherein
said game program causes said computer to further execute region setting for setting a predetermined region, and
said skin color region calculating calculates the size of the skin color region within said predetermined region set by said region setting.

6. The non-transitory storage medium storing a game program according to claim 1, wherein
said determining determines whether or not said user is detected by determining that an entire or a part of the face of said user is detected on the basis of the image data representing the image obtained through the imaging.

7. The non-transitory storage medium storing a game program according to claim 1, wherein
said game program causes said computer to further execute microphone input determining for determining whether or not said microphone input information satisfies a predetermined condition, and
said computer executes the game processing on the basis of said microphone input information when said determining determines that said user is detected, and said microphone input determining determines that said predetermined condition is satisfied.

8. The non-transitory storage medium storing a game program according to claim 1, wherein
said game program causes said computer to further execute preliminary-imaging for imaging said user in advance, and
feature data calculating for calculating feature data indicating a feature of said user on the basis of the image data representing the image obtained by imaging said user in advance by said preliminary-imaging, wherein
said determining determines whether or not said user is detected on the basis of the image data representing the image obtained through the imaging and the calculated feature data.

9. The non-transitory storage medium storing a game program according to claim 8, wherein
said feature data calculating calculates a skin color threshold value corresponding to the feature of the skin color of said user on the basis of the image data representing the image obtained by imaging said user in advance, and
said game program causes said computer to further execute skin color image extracting for extracting a skin color image from the image obtained through the imaging on the basis of the skin color threshold value calculated by said feature data calculating, and
skin color region calculating for calculating a size of a skin color region in said image on the basis of the image data representing the image obtained through the imaging and the image data indicating the skin color image extracted from said skin color image extracting, and
said determining determines that said user is detected when the size of said calculated skin color region is equal to or more than a predetermined value.

10. The non-transitory storage medium storing a game program according to claim 8, wherein
said feature data calculating calculates skin color feature data indicating the feature of the skin color of said user on the basis of the image data representing the image obtained by imaging said user in advance, and
said determining determines whether or not said user is detected on the basis of the image data representing the image obtained through the imaging and the skin color feature data calculated by said feature data calculating.

11. A game apparatus that comprises a camera and a microphone, the game apparatus further comprising a computer configured to at least execute:
initiating imaging with said camera to input an image;
initiating inputting with said microphone to input microphone input information,
fetching an image that is imaged by said camera at an image fetching timing,
determining whether a user is detected on the basis of image data representing the fetched image,
fetching the microphone input information inputted in said initiating inputting with said microphone upon a determination that said user is detected, and
performing game processing based on said fetched microphone input information.

12. The game apparatus according to claim 11, wherein
said camera and said microphone are provided such that an imaging direction and a sound collecting direction are substantially in parallel with each other.

13. A game processing method executing game processing in a game apparatus that comprises a camera and a microphone, comprising at least:

initiating imaging with said camera to input an image, initiating inputting with said microphone to input microphone input information, fetching an image that is imaged by said camera at an image fetching timing, determining whether a user is detected on the basis of image data representing the fetched image, fetching the microphone input information inputted in said initiating inputting with said microphone when it is determined that said user is detected, and performing game processing based on said fetched microphone input information.

14. A game system executing game processing, comprising:

a camera for imaging a user;

a microphone;

the game system further comprising a computer configured to at least execute:

initiating imaging with said camera to input an image, initiating inputting with said microphone to input microphone input information, fetching an image that is imaged by said camera at an image fetching timing, determining whether a user is detected on the basis of image data representing the fetched image, fetching the microphone input information inputted in said initiating inputting with said microphone upon a determination that said user is detected, and performing game processing based on said fetched microphone input information.

\* \* \* \* \*